(12) United States Patent
Nagle

(10) Patent No.: US 8,392,887 B2
(45) Date of Patent: Mar. 5, 2013

(54) SYSTEMS AND METHODS FOR IDENTIFYING GRAPHIC USER-INTERFACE COMPONENTS

(75) Inventor: Carl Joseph Nagle, Holly Springs, NC (US)

(73) Assignee: SAS Institute Inc., Cary, NC (US)

( * ) Notice: Subject to any disclaimer, the term of this patent is extended or adjusted under 35 U.S.C. 154(b) by 801 days.

(21) Appl. No.: 12/484,638

(22) Filed: Jun. 15, 2009

(65) Prior Publication Data

US 2010/0318971 A1 Dec. 16, 2010

(51) Int. Cl.
*G06F 9/44* (2006.01)
(52) U.S. Cl. ............... 717/125; 717/124; 717/135
(58) Field of Classification Search ............... None
See application file for complete search history.

(56) References Cited

U.S. PATENT DOCUMENTS

| | | | |
|---|---|---|---|
| 7,165,240 B2 * | 1/2007 | Patterson | 717/116 |
| 7,870,504 B1 | 1/2011 | McIntosh et al. | |
| 2002/0136465 A1 * | 9/2002 | Nagashima | 717/125 |
| 2003/0236775 A1 * | 12/2003 | Patterson | 717/125 |
| 2004/0081346 A1 * | 4/2004 | Louden et al. | 717/124 |
| 2004/0194054 A1 * | 9/2004 | McGrath et al. | 717/135 |
| 2009/0265689 A1 * | 10/2009 | Gooi et al. | 717/125 |
| 2010/0095276 A1 * | 4/2010 | Ottavi et al. | 717/124 |
| 2010/0114939 A1 * | 5/2010 | Schulman et al. | 717/135 |

OTHER PUBLICATIONS

James Oliverio, ISAS: A Human-Centric Digital Media Interface to Empower Real-Time Decision-Making Across Distributed Systems, 2007, ACM, 8 pages, <URL: http://delivery.acm.org/10.1145/1230000/1229403/p81-oliverio.pdf>.*
Khalad Hasan, Comet and Target Ghost: Techniques for Selecting Moving Targets, 2011, ACM, 10 pages, <URL: http://delivery.acm.org/10.1145/1980000/1979065/p839-hasan.pdf>.*
Tsung-Hsiang Chang, GUI Testing Using Computer Vision, 2010, ACM, 10 pages, <URL: http://delivery.acm.org/10.1145/1760000/1753555/p1535-chang.pdf>.*

(Continued)

*Primary Examiner* — Thuy Dao
*Assistant Examiner* — Hua Lu
(74) *Attorney, Agent, or Firm* — Kilpatrick Townsend & Stockton LLP

(57) ABSTRACT

Systems and methods for identifying a target position on a computer display are provided. A system receives computer display data indicative of contents of a computer display and identifies a first area of interest within the computer display. Identifying the area of interest includes receiving a first image and searching the computer display for the first image. Upon finding a match for the first image, a location of the match for the first image is identified as a first point. A second image is received and searched for on the computer display. Upon finding a match for the second image, the location of the match is identified as a second point. The first point and the second point are used in defining an area of interest. A target position is located within the area of interest.

51 Claims, 37 Drawing Sheets

OTHER PUBLICATIONS

Liu Zhifang, Test Automation on Mobile Device, 2010, ACM, 7 pages, <URL: http://delivery.acm.org/10.1145/1810000/1808267/p1-liu.pdf>.*

A. Ahmad, Design of a Dynamic Test Tool in the Area of Digital System Testing, 2009, Google Scholar, 4 pages, <URL:http://icccp.net/proceedings/2009/Papers/ICCCP09-094.pdf>.*

Amjad Farooq, A Framework for Testing Software Product, 2010, Google Scholar, 10 pages, <URL: http://www.jofamericanscience.org/journals/am-sci/am0612/19_3244am0612_164_173.pdf>.*

Eggplant Functional Tester Datasheet, "Does the idea of writing test scripts leave a bitter taste in your mouth? Sweeten the process with Eggplant Functional Tester.", 2 pp. (2008).

Eggplant Reference Manual, Eggplant: Tutorials 4.1, pp. 1-32 (2008).

Eggplant Reference Manual, Eggplant Using Eggplant 4.1, pp. 1-56 (2008).

* cited by examiner

SYSTEMS AND METHODS FOR IDENTIFYING GRAPHIC USER-INTERFACE COMPONENTS

FIELD

The technology described in this patent document relates generally to computer displays and more specifically to computer display data capture.

BACKGROUND

The area of software testing uses test automation tools that can be programmed to analyze and evaluate software application functionality without human intervention. During the automated test, there may be a need to identify specific elements or components of a graphical user interface that is being tested. This can occur where the test automation tool is not able to work with or have access to the underlying technology that was used to create the application being tested, and thus the test automation tool may need to identify a specific element in a captured image of the interface.

FIG. 1 depicts at 10 a prior art process for identifying a target image. In this approach, a single target image 12 is sought within a larger source image. The source may be acquired via a screen capture or snapshot taken from the computer screen, a transfer from a display buffer, or other mechanism. During the process 10, a search of the source image is executed at 14 for the target image 12. If the target image 12 is found in the source, as shown at 16, then the location of the found target image is returned. If the target image 12 is not found, then an indicator of such is returned at 18.

SUMMARY

In accordance with the teachings provided herein, systems and methods are provided for identifying an area of interest on a computer display. Computer display data indicative of contents of a computer display may be received. The computer display data is processed to identify an area of interest within the computer display, the identifying of an area of interest including receiving a first image, searching the computer display for the first image, and identifying a location of a match as a first point. The method of identifying an area of interest further includes receiving a second image, searching the computer display for the second image, and identifying a location of a match as a second point. The first point and second point may be used in defining an area of interest, where the area of interest defines a region where a data hotspot may be located.

As a further example, a system and method for identifying a target position on a computer display may include receiving computer display data indicative of contents of a computer display. The computer display data is processed to identify an area of interest within the computer display, the identifying including receiving a first image, searching the computer display for the first image, and identifying a location of a match as a first point. The identifying an area of interest further includes receiving a second image, searching the computer display for the second image, and identifying a location of a match as a second point. The first point and second point may be used in defining an area of interest. A target position may be identified within the area of interest, wherein identifying the target position includes receiving a target position image and searching the area of interest for the target position image. Upon finding a match for the target position image, a location of the match for the target position image may be identified as a target position. The target position may be stored in a computer readable memory.

As another example, a system and method can be configured for extracting a data value from within a computer display data hotspot following identification of a location of the data hotspot on the computer display. This may include receiving computer display data indicative of contents of a computer display. The computer display data is processed to identify an area of interest within the computer display by receiving a first anchor image, searching the computer display for the first anchor image, and upon finding a match for the first anchor image, identifying a location of the match for the first anchor image as a first anchor point. The identifying an area of interest may further include receiving a second anchor image, searching the computer display for the second anchor image, and upon finding a match for the second anchor image, identifying a location of the match for the second anchor image as a second anchor point. The identifying an area of interest may further include receiving a third anchor image, searching the computer display for the third anchor image, and upon finding a match for the third anchor image, identifying a location of the match for the third anchor image as a third anchor point. The first, second, and third anchor points may define the area of interest. The system may further include identifying a computer display data hotspot within the area of interest by receiving a hotspot anchor image, searching the area of interest for the hotspot anchor image, and upon finding a match for the hotspot anchor image, identifying a location of the match for the hotspot anchor image as a hotspot anchor point, the computer display data hotspot being defined relative to the hotspot anchor point. The data value may be extracted from within the computer display data hotspot.

As a further example, a system and method can be configured for identifying a target position on a computer display device and can include a display device buffer and a processor for receiving computer display data indicative of contents of a computer display from the display device buffer. The processor may be further configured to receive a first image and search the computer display for the first image. Upon finding a match for the first image, the processor may store the location of the match for the first image as a first point. The processor may be further configured to receive a second image and search the computer display for the second image. Upon finding a match for the second image, the processor may store the location of the match for the second image as a second point. The first point and the second point may be used in defining the area of interest. The processor may be further configured to identify the target position within the area of interest by receiving a target position image and searching the area of interest for the target position image. Upon finding a match for the target position image, a location of the match for the target position image may be identified as the target position, and the target position may be stored in a computer readable memory.

DETAILED DESCRIPTION

Systems and methods are described herein for accurately identifying specific elements or components on a graphic display device or on an image captured from a graphic display device. For example, a system can be configured to provide a search mechanism that identifies the bounds of an "area of interest"—like a parent window—and limit the search scope for the target image to within these bounds. In this example, an area of interest is defined by two or three "anchor images" which allows the search mechanism to determine the location, width, and height of the area of interest in which to search for any subsequent target image.

Figure 1:
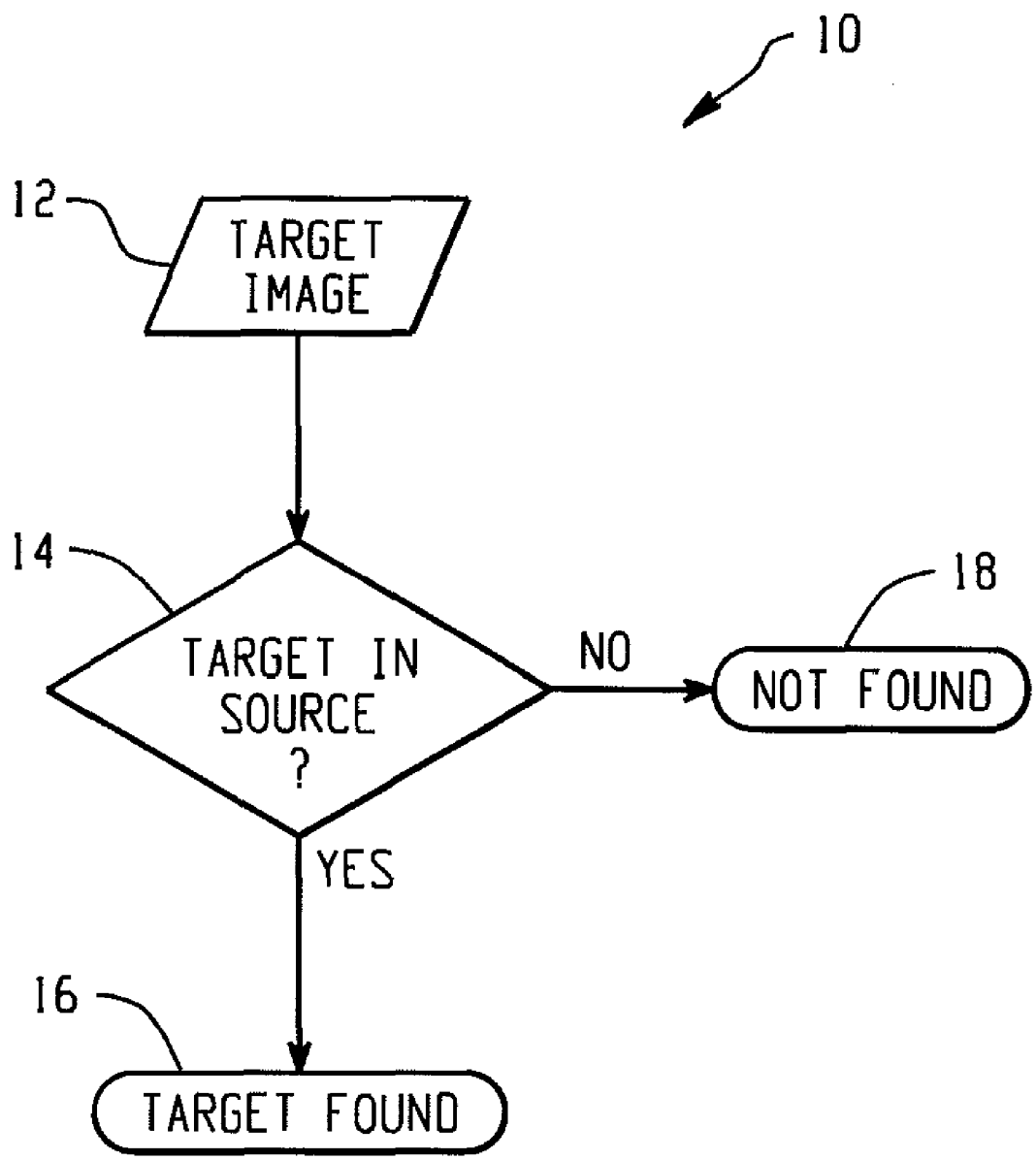
FIG. 1 is a flow diagram depicting a prior art process for identifying a target image.
Figure 2:
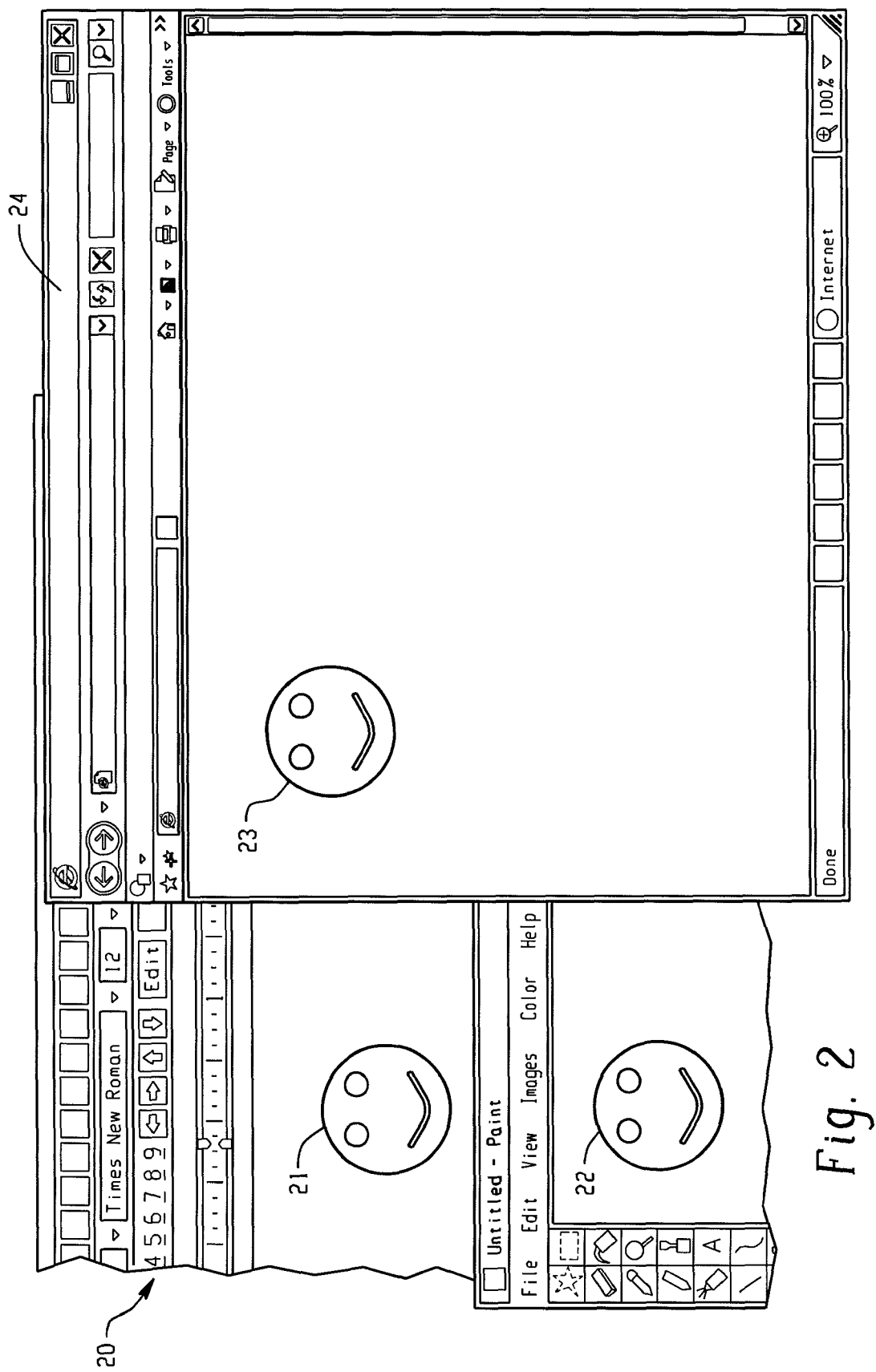
FIG. 2 is a screenshot illustrating a screenshot having multiple instances of an image.

The capability of the system's search mechanism is illustrated with reference to FIG. 2. FIG. 2 is a screenshot illustrating an example graphical user interface that can be processed by the search mechanism. Although there is a commonality of the user interface elements of FIG. 2 (e.g., multiple windows may have identical ('X') buttons for closing the window), the search mechanism identifies the correct target image within the source image. FIG. 2 provides another illustration of multiple common elements in its portrayal of three identical smiley face images 21, 22, 23 in a source image 20. If it is desired to find the smiley face in the Internet Explorer™ window 24, then the search mechanism can determine that the smiley face at 23 is the correct one.

The system's search mechanism may be used in a variety of contexts. For example, such a capability may be useful in automated testing of candidate software without integration of testing code into the candidate software. By identifying certain target positions within a display, the candidate software may be manipulated and/or testing data may be extracted for analysis. For example, certain display components may be identified within the display. Such display components may include buttons, check boxes, radio selectors, text fields, data tables, data table cells, etc. Once located, these display components may be manipulated to simulate user activity to test the candidate software. Data regarding the candidate software performance may be extracted to analyze the performance of the software under test. For example, a data value from a cell of a data table may be extracted from a screen capture and compared to an expected value to determine if the software is performing properly. Testing in this manner not only enables testing of the software but also a system's interaction with the software.

Figure 3:
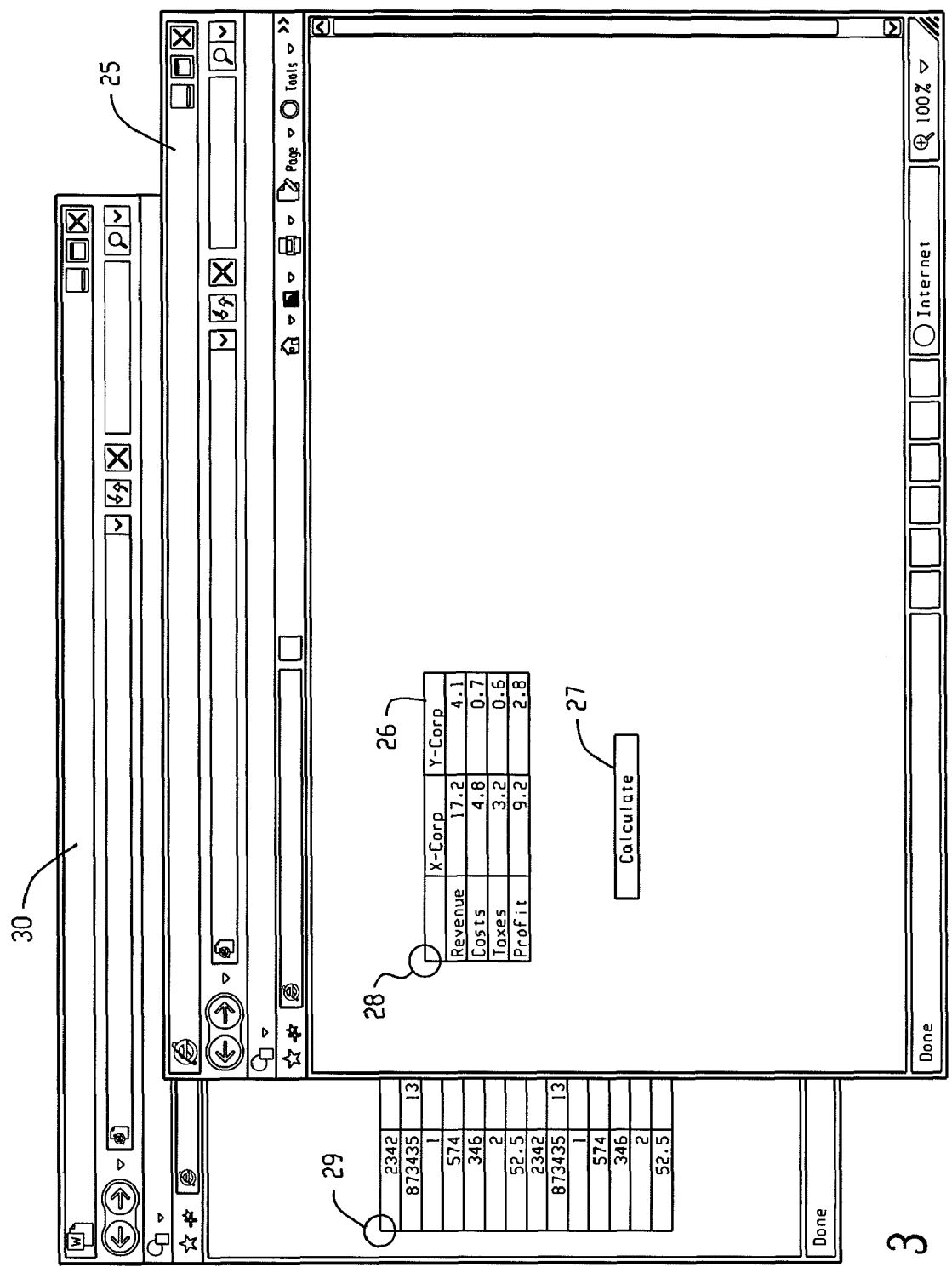
FIG. 3 depicts an example screen shot of a system undergoing testing.

As another illustration, FIG. 3 depicts an example screen shot of a system undergoing testing. A candidate program being tested is running in the Internet Explorer™ window 25. The program includes a table 26 that includes a number of data values and a button 27 that may be pressed to update calculations in the data table 26. To automate testing of the program, a target image search system finds the location of the table 26 and the button 27 so that data in the table may be manipulated and captured. Additionally, button presses may be simulated by sending mouse click commands at the location of the button 27. In the system, the scope of the search is limited to the area of interest defined by the window 25, avoiding a faulty finding of the table in the Microsoft Word™ window 30. Upon locating the data table 26 and button 27, data in the cells can be automatically entered into the table, a calculation can be commanded by simulating clicks of the button 27, and data may be extracted based on the known locations of the table 26 and button 27. Data may be extracted, for example, by a screen capture of a desired cell and performing an optical character recognition procedure on the screen capture portion. The extracted data may then be compared to expected results to examine whether the candidate software is functioning properly.

Figure 4:
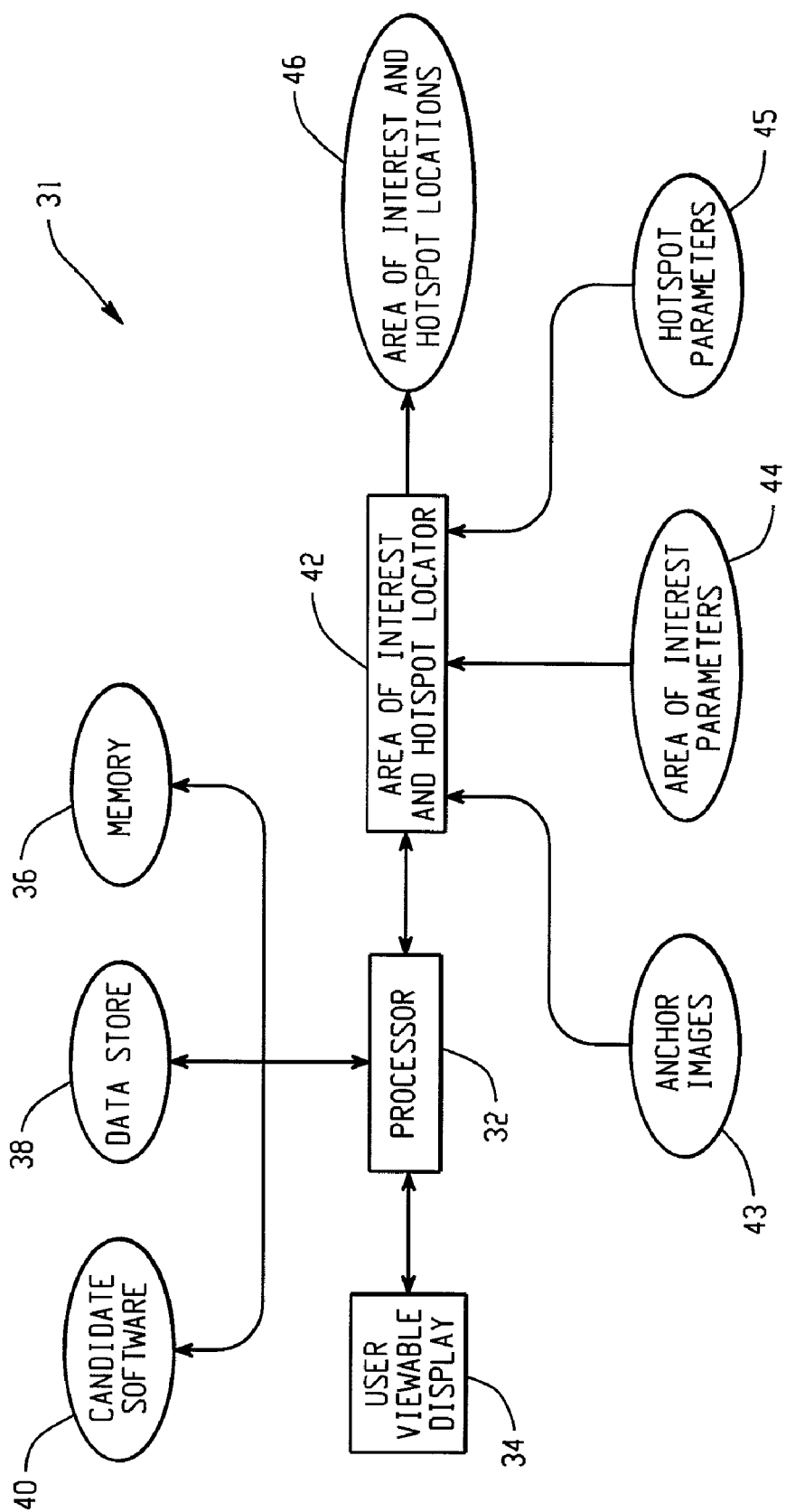
FIG. 4 is a block diagram depicting a computer-implemented environment where a hotspot locator and data extractor can interact with a processor based computer system.

A search mechanism can be implemented in a number of different environments. For example, FIG. 4 depicts a computer-implemented environment where an area of interest and hotspot locator (e.g., a software routine, module, etc.) can interact with a processor based computer system. A data processor 32 is responsive to a user viewable display 34 for providing output to a user. The data processor 32 also interacts with a system memory 36, a data store 38, as well as other applications, such as candidate software 40 that is to undergo testing.

An area of interest and hotspot locator 42 communicates with the data processor 32 to identify certain areas of interest and 'hotspots.' These hotspots may be useful in performing software testing or other operations at a high level, without the need for low level system/software integration. The area of interest and hotspot locator 42 receives anchor images 43, area of interest parameters 44, and hotspot parameters 45 as well as display data to identify hotspots within the display data via the processor 32. The display data can represent a view for display on a single physical monitor or multiple screens. The area of interest and hotspot locator 42 outputs identified areas of interest and hotspot locations.

The area of interest and hotspot locator 42 may communicate with the data processor 32 in a variety of ways. For example, the area of interest and hotspot locator 42 may be included locally on the same computer as the data processor 32. Alternatively, the area of interest and hotspot locator 42 may be hosted on one or more servers and communicate with the data processor through a network (not shown) as well as other configurations where display data may be retrieved and analyzed by the area of interest and hotspot locator 42.

One or more data stores 38 can store anchor image data 43, area of interest parameters 44, hotspot parameters 45, and area of interest and hotspot locations 46 as well as any intermediate or final data generated by the system 31. Examples of data store(s) 38 can include flat files, relational database management systems (RDBMS), a multi-dimensional database (MDDB), such as an Online Analytical Processing (OLAP) database, etc.

Figure 5:
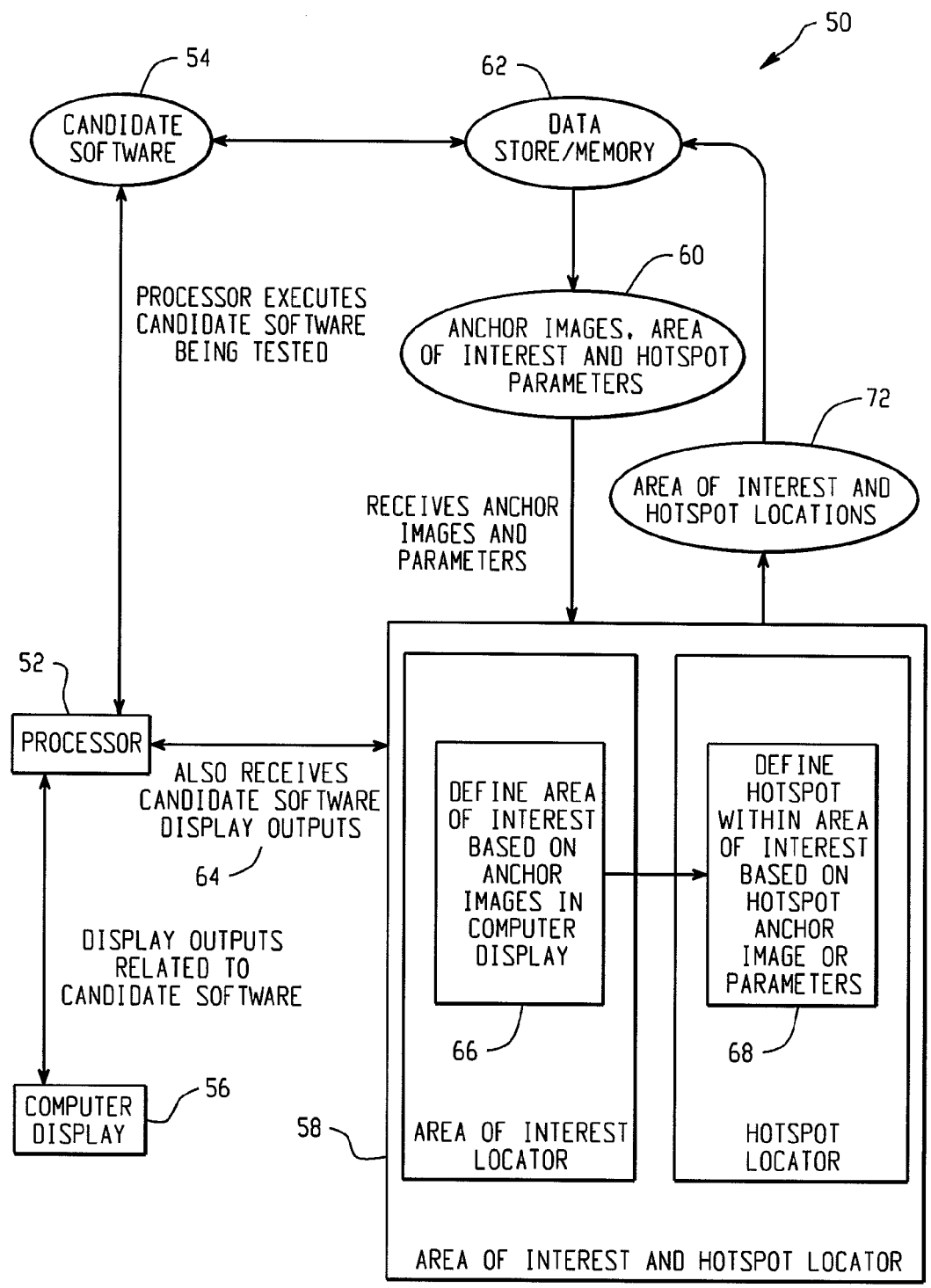
FIG. 5 is a block diagram depicting a system for identifying an area of interest and hotspot in testing candidate software.

FIG. 5 is a block diagram depicting a system for identifying an area of interest and hotspot in testing candidate software. A data processor 52 executes candidate software 54 for testing. The execution of the candidate software 54 by the data processor 52 results in display outputs related to the candidate software 54 being transmitted to and shown on a computer display 56. An area of interest and hotspot locator 58 receives anchor images, area of interest parameters, and hotspot parameters 60 from a data store/memory 62 that may also contain the candidate software 54 for testing. The area of interest and hotspot locator 58 also receives candidate software display data indicative of the contents of the display from the data processor 52, as indicated at 64. The area of interest and hotspot locator 58 identifies an area of interest based on anchor images located in the computer display, as shown at 66, and defines a hotspot within the area of interest based on a hotspot anchor image or hotspot parameters at 68. The area of interest and hotspot locations 72 may be outputted and stored in a data store/memory 62.

Figure 6:
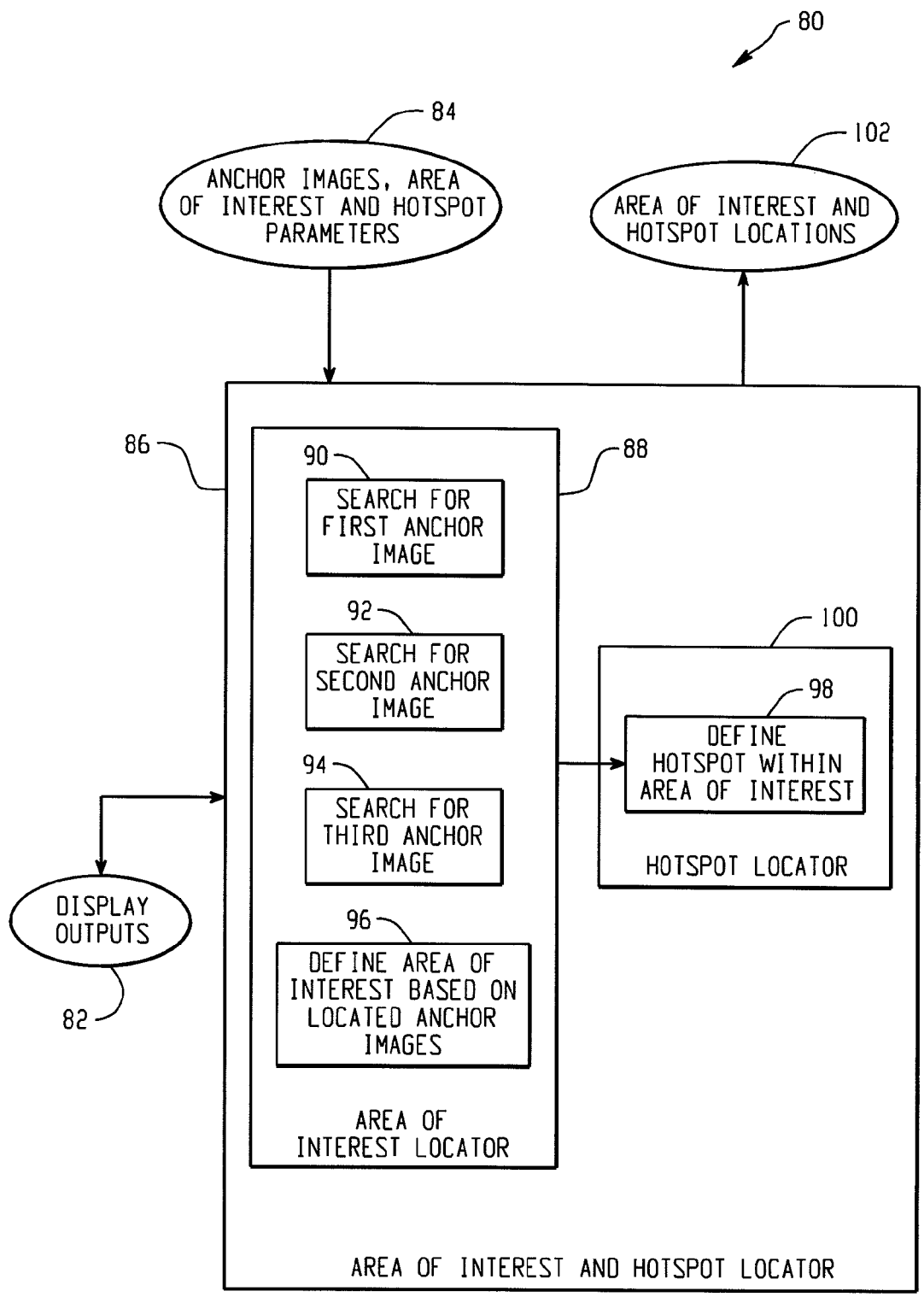
FIG. 6 is a block diagram of an area of interest and hotspot locator depicting steps for defining an area of interest using three anchor points.

FIG. 6 is a block diagram of an area of interest and hotspot locator depicting steps in an operational scenario for defining an area of interest using three anchor points. Display outputs 82 and anchor images, area of interest parameters, and hotspot parameters 84 are received by the area of interest and hotspot locator 86. The area of interest locator 88 searches the display for a first anchor image, as shown at 90, and upon finding the first anchor image, saves its location as a first anchor point. The area of interest locator 88 searches the display for a second anchor image, as shown at 92, and upon finding the second anchor image, saves its location as a second anchor point. The area of interest locator 88 searches the display for a third anchor image, as shown at 94, and upon finding the third anchor image, saves its location as a third anchor point. Through the use of the three identified anchor points, an area of interest is defined, as shown at 96. For example, the first anchor point may correspond with a top-left corner of the area of interest, the second anchor point may correspond to the upper-right corner of the area of interest, and the third anchor point may correspond to the lower-right corner of the area of interest. With these three points, the location, height, and width of the area of interest can be defined.

After defining the area of interest, a hotspot is defined within the area interest, as shown at 98. A hotspot may be defined by a number of procedures. For example, a hotspot may be defined by locating another target image through a search limited to the defined area of interest. Alternatively, a hotspot may be defined using offset values that may be included in the hotspot parameters 84. Example offset values include distance, point, and pixel offsets from certain features of the area of interest (e.g., the center of the area of interest, 10 pixels down from the top side and 7 pixels in from the left side of the area of interest, etc.). Locations and other parameters of located areas of interest and hotspots 102 may then be output from the area of interest and hotspot locator 86.

Figure 7:
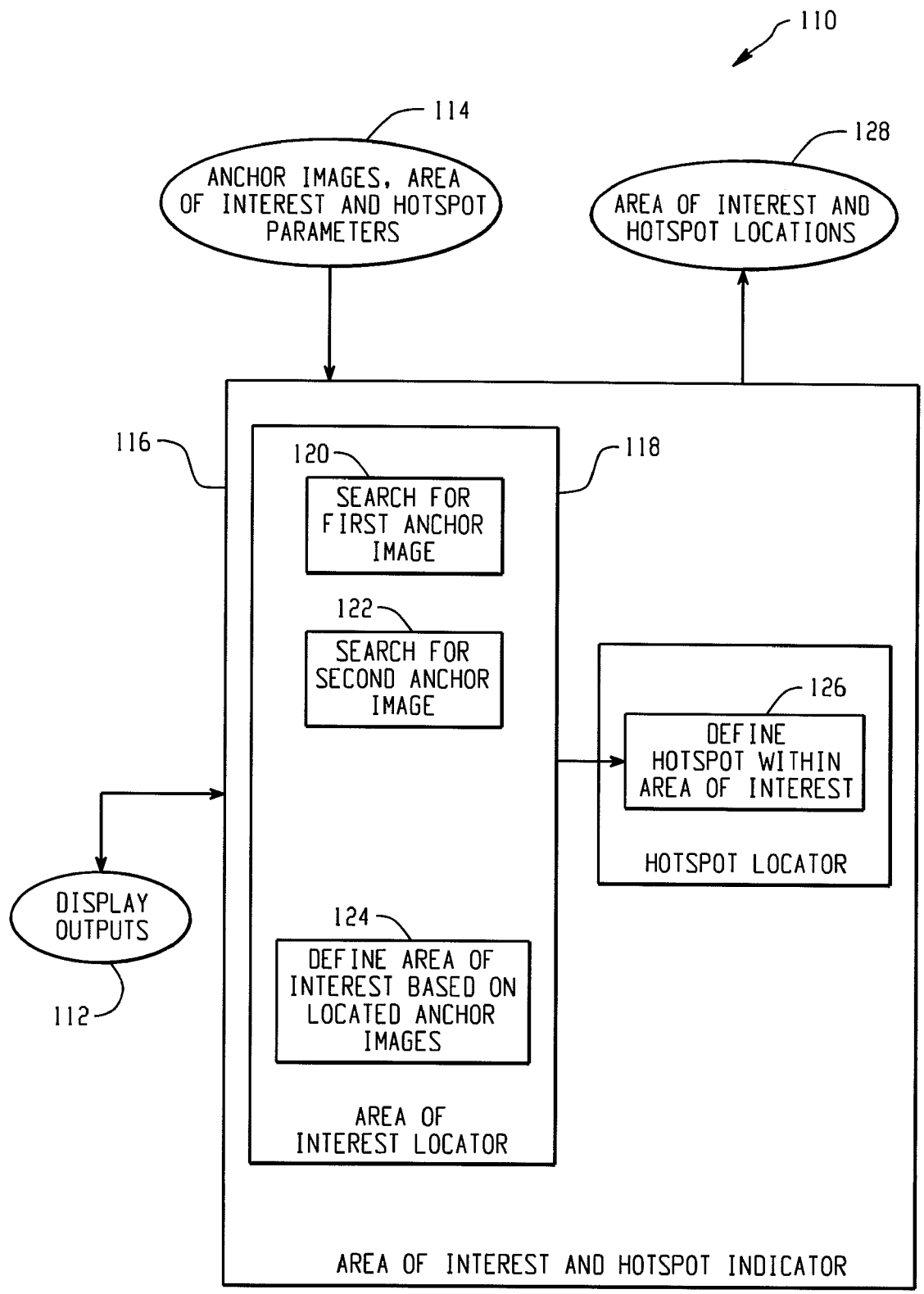
FIG. 7 is a block diagram of an area of interest and hotspot locator depicting steps for defining an area of interest using two anchor points.

FIG. 7 is a block diagram of an area of interest and hotspot locator depicting steps in another operational scenario for defining an area of interest using two anchor points. Display outputs 112 and anchor images, area of interest parameters, and hotspot parameters 114 are received by the area of interest and hotspot locator 116. The area of interest locator 118 searches the display for a first anchor image, as shown at 120, and upon finding the first anchor image, saves its location as a first anchor point. The area of interest locator 118 searches the display for a second anchor image, as shown at 122, and upon finding the second anchor image, saves its location as a second anchor point. Using the two identified anchor points, an area of interest is defined based on the located anchor images, as shown at 124. For example, the first anchor point may correspond with a top-left corner of the area of interest and the second anchor point may correspond to the lower-right corner of the area of interest. With these two points, the location, height, and width of the area of interest can be defined. By locating two or more anchor images within a source image and extrapolating the location and dimensions of the area of interest, the search for child elements or components can be limited in scope. Alternatively, the parameters of the area of interest alone may be returned for utilization by other processes or applications.

After defining the area of interest, a hotspot is defined within the area interest, as shown at 126. After identifying a hotspot at 126, parameters of the area of interest and hotspot may be outputted, as shown at 128.

Figure 8:
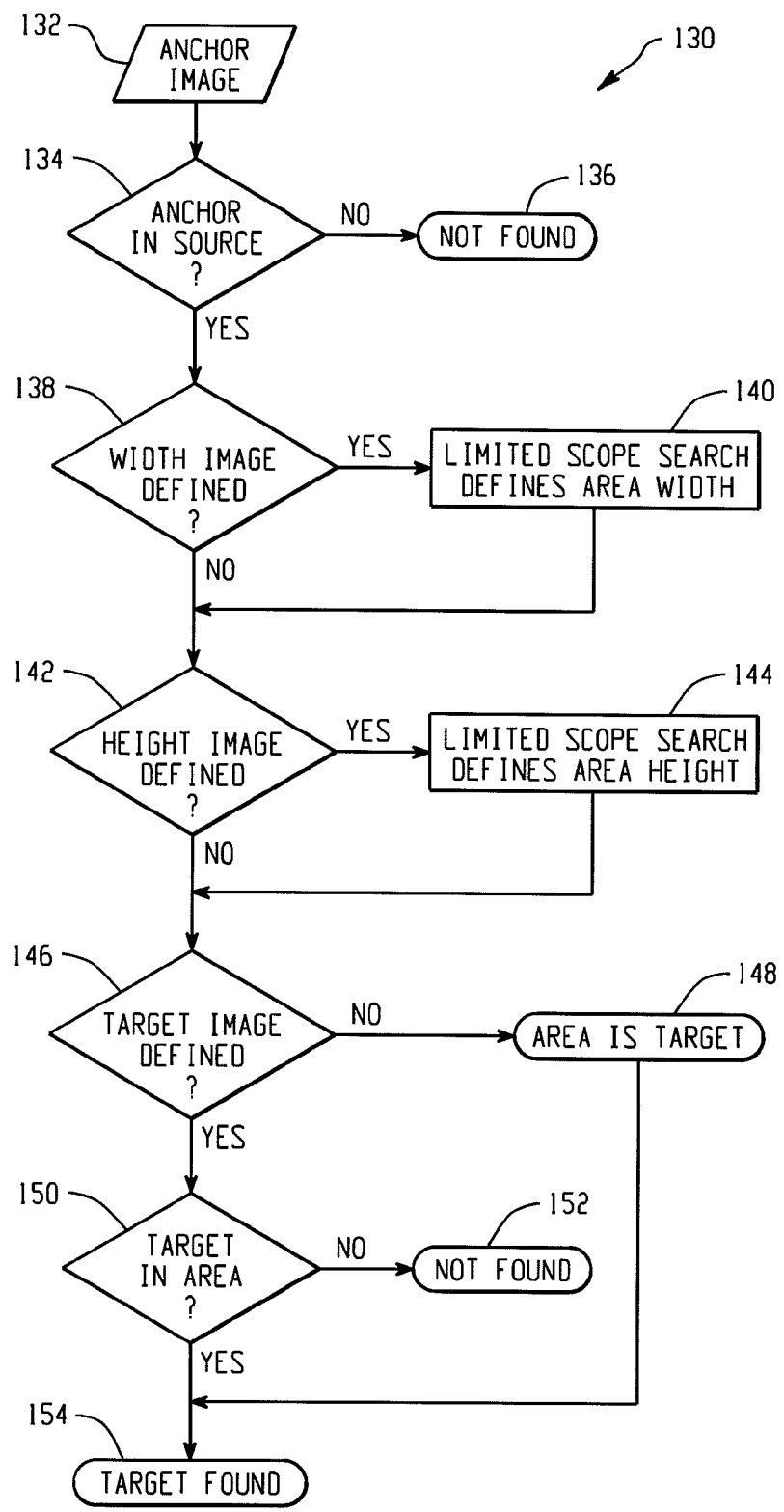
FIG. 8 is a flow diagram depicting an area of interest based search for a target position.

FIG. 8 is a flow diagram depicting an area of interest based search for a target position. The process of FIG. 8 begins upon receipt of an anchor image 132. This anchor image 132 may or may not correspond with the upper left corner of the sought after area of interest. A search of the display is performed at 134. If the anchor image 132 is not found, then an indicator of such is returned at 136.

If the anchor image 132 is found, then an inquiry is made at 138 as to whether a width anchor image is defined. If a width anchor image is defined, a limited scope search is executed at 140 to determine the width of the area of interest. Such a limited scope search may, for example, search substantially only to the left or right of the anchor image 132 found at 134. For example, after finding a first anchor image 132 corresponding to the upper left corner of the desired area of interest, a limited scope search may be performed for a width image (e.g., an 'X' button for closing a window) substantially to the right of the located first anchor image 132. Limiting the scope of such a search increases search speed and may also increase search accuracy by avoiding location of unintended identical width images (e.g., by limiting the search to substantially to the right of an upper-left corner first anchor image, 'X' buttons for other non-area of interest windows will probably not be erroneously identified). Upon location of the width image via the limited scope search, the width of the area of interest can be defined.

At 142, an inquiry is made as to whether a height anchor image is defined. If a height anchor image is defined, a limited scope search is executed at 144 to determine the height of the area of interest. Such a limited scope search may, for example, search substantially only up or down from an anchor image located at 134 or 140. For example, after finding a width anchor image corresponding to the upper right corner of the desired area of interest, a limited scope search may be performed for a height image (e.g., a screen capture of the lower right corner of a window) substantially down from the located width anchor image. Upon location of the height image via the limited scope search, the height of the area of interest may be defined.

At 146, an inquiry is made as to whether a target image is defined. If no target image is defined, then the area defined by the found anchor image 132, possibly expanded in width and/or height by any found width image 138 and/or height image 142, may be returned as the target location, as shown at 148. If a target image is defined, the area of interest is searched for the target image at 150. If the target image is not found, an indication of such is returned at 152. If the target image is found, then the location of the target image in the area of interest is returned as the target location at 154.

Figure 9:
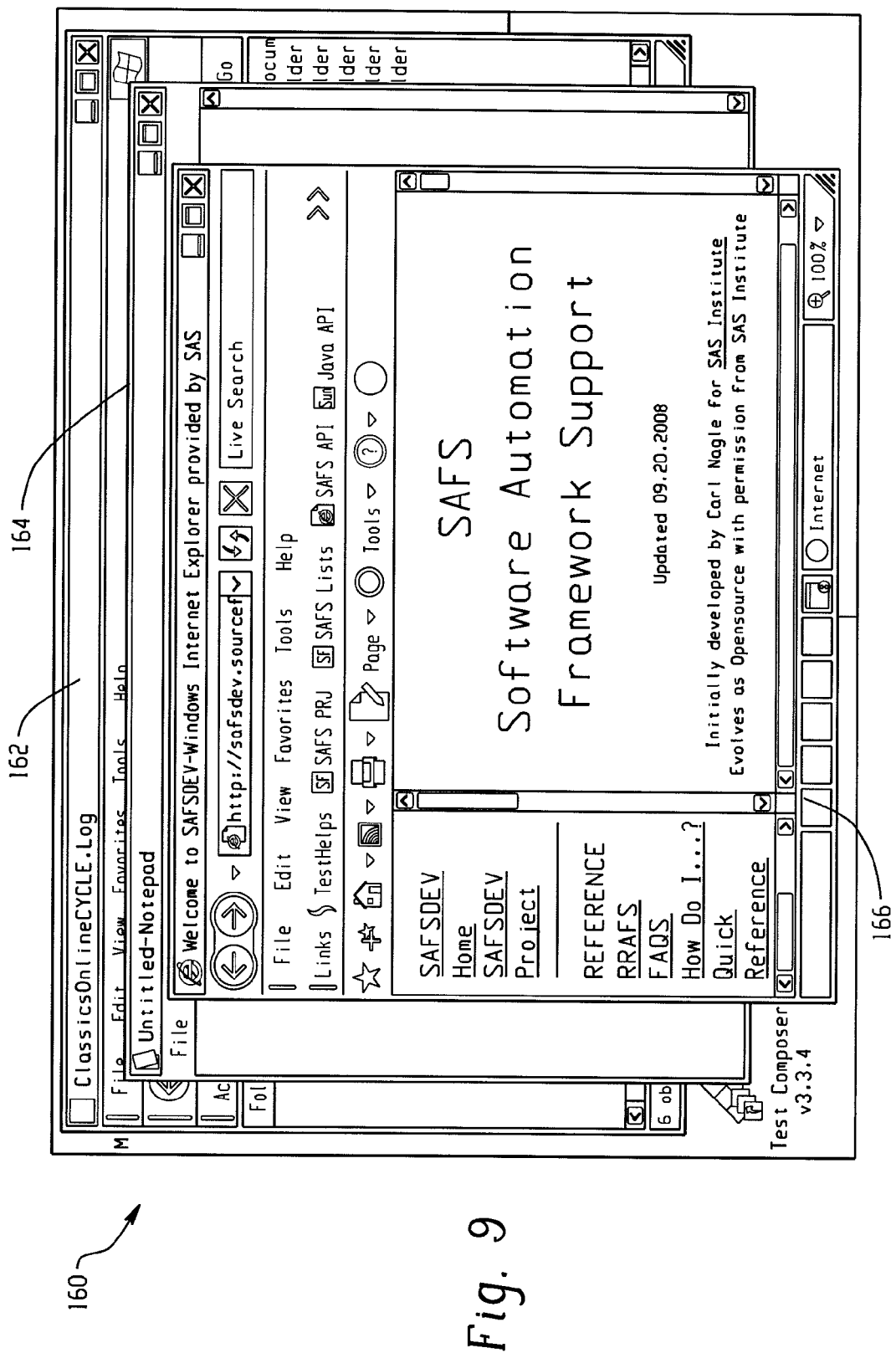
FIG. 9 depicts an example display to be searched for a target location.
Figure 10:
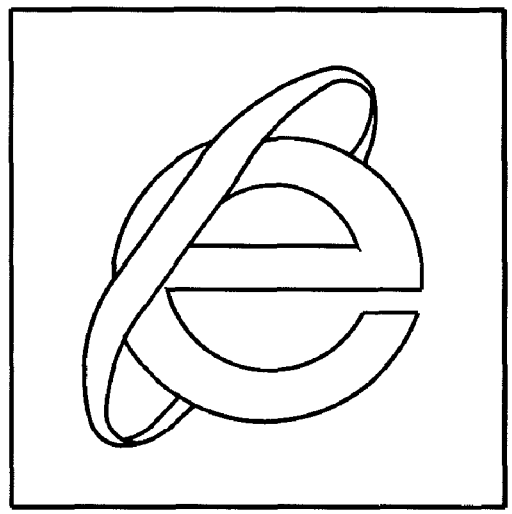
FIG. 10 is an Internet Explorer™ logo that is displayed in the upper left corner of an Internet Explorer™ window.
Figure 11:
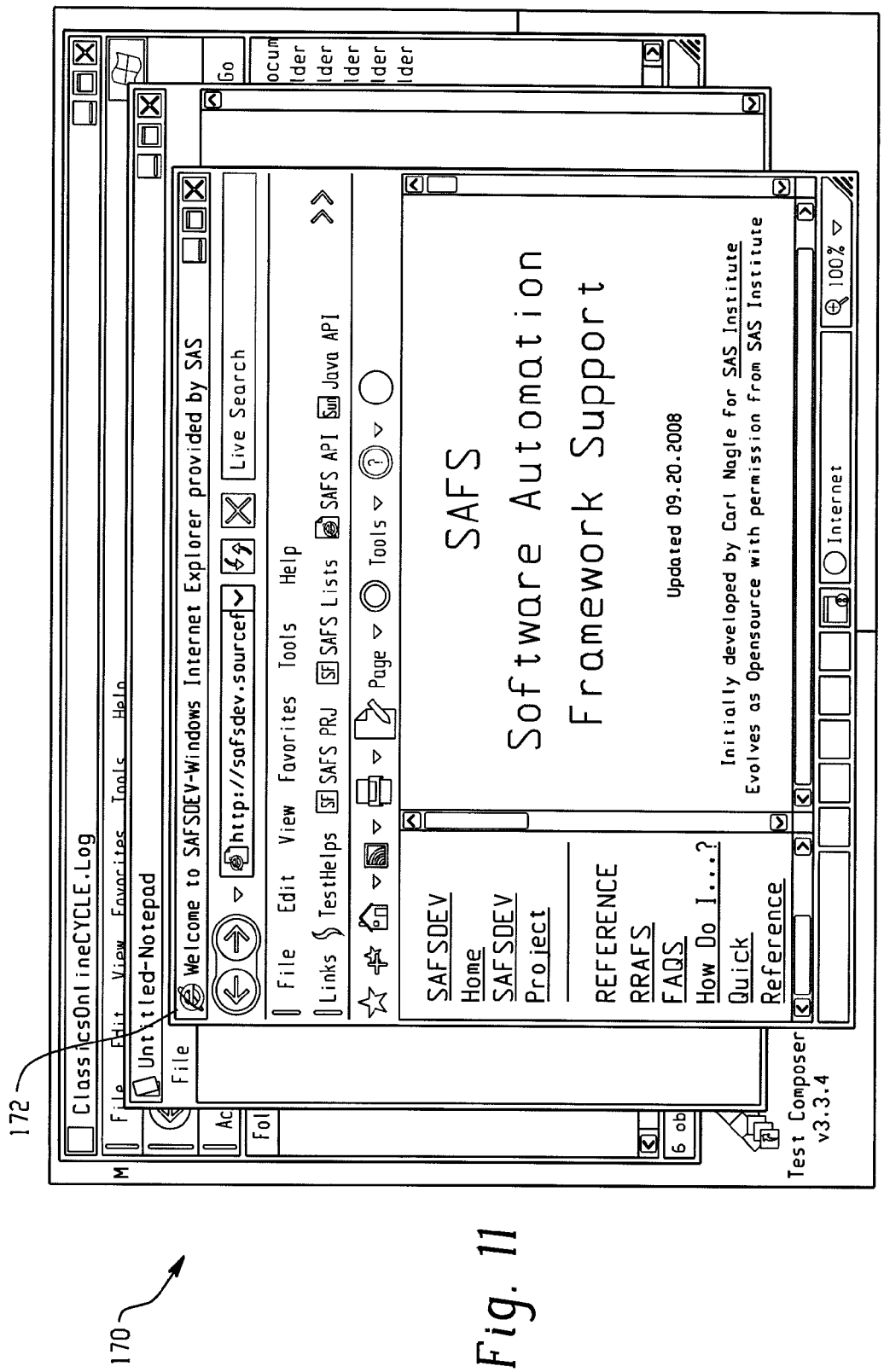
FIG. 11 depicts the location of the anchor image in a display.

FIGS. 9-22 depict additional example operational scenarios for defining areas of interest in which to locate a target position. FIGS. 9-18 depict an example where the width of the area of interest is determined followed by the height. FIG. 9 depicts an example display to be searched for a target location. The example display 160 is a Windows™ desktop display including three windows 162, 164, 166, where one window 166 is in focus. FIG. 10 depicts a first anchor image. The anchor image of FIG. 10 is an Internet Explorer™ logo that is displayed in the upper left corner of an Internet Explorer™ window. FIG. 11 depicts the location of the anchor image of FIG. 10 in a display at 172.

Upon receipt of the first anchor image in FIG. 10, a search of the display, originally depicted in FIG. 9, is performed to find the first anchor image in the display. By searching the display, for example in a left-to-right, top-to-bottom scan, the first anchor image is located at 172, and the location of the first anchor image is noted as a first point. Additional, logic may be necessary to discern among multiple occurrences of the first anchor image. However, because the first anchor image only appears once in FIG. 11 at 172, position 172 is deemed the correct first point. Locating the first point could be accomplished using the following code fragment:

Target=IExplorerAnchor, where the first anchor image, depicted in FIG. 10, is denoted as "IExplorerAnchor."

Figure 12:
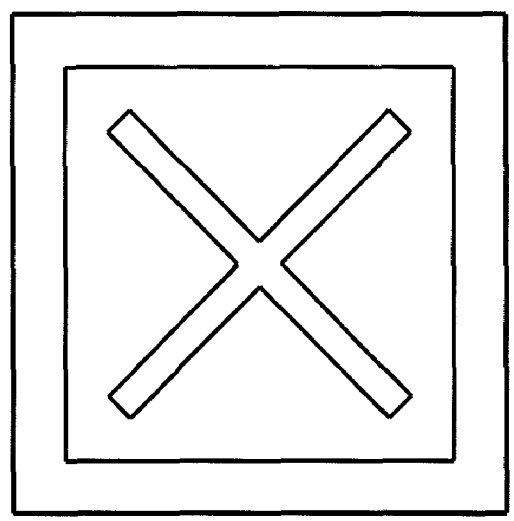
FIG. 12 depicts a second, width anchor image.

FIG. 12 depicts a second, width anchor image. The second anchor image corresponds to an 'X' button for closing a window. The 'X' button is a common object that may appear on the top bar of every window on the screen. Thus, a full screen scan for such an anchor image could prove ineffective at finding the desired anchor image. However, execution of a limited scope width search, such as described below with respect to FIG. 13, can enable higher accuracy and speed in finding the desired second anchor image.

Figure 13:
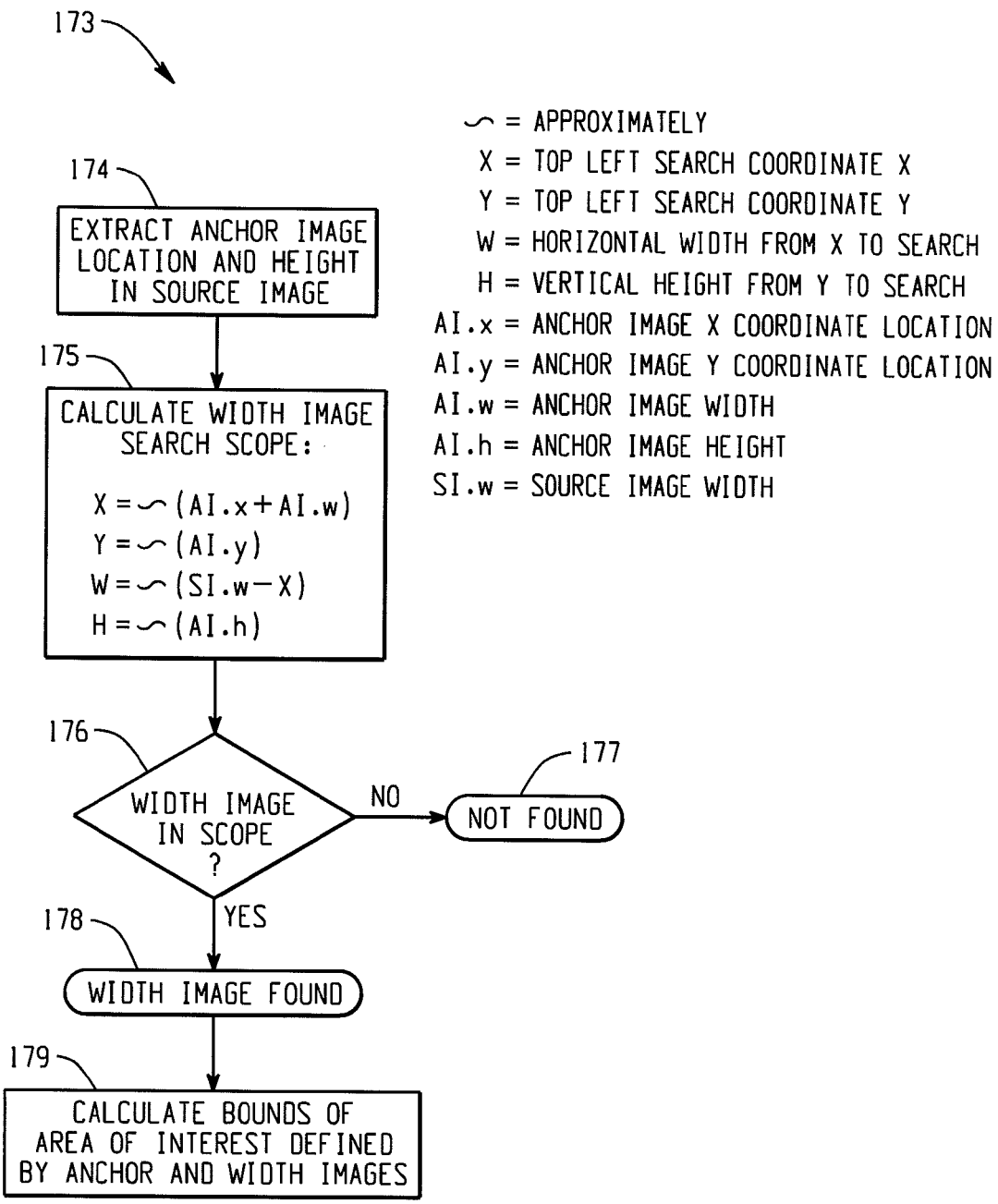
FIG. 13 is a flow diagram depicting steps of an example limited scope width search.

FIG. 13 is a flow diagram depicting steps of an example limited scope width search. At 174, a first anchor point is defined by identifying the location of the first anchor image and its height in the source image. The scope of the limited scope width search is then determined at 175. The top left search coordinate, X,Y, is calculated as the x-coordinate of the first anchor point plus the width of the anchor image and the y-coordinate of the first anchor point, respectively. The width of the search area is calculated as the width of the source image minus the x-coordinate of the first anchor point minus the width of the first anchor image (e.g., the entire source image to the right of the first anchor image), and the height of the search area is identified as the height of the first anchor image. Following calculation of the scope of the width search, the search is performed at 176. If the width anchor image is not found, an identification of such is returned at 177. If the width anchor image is found at 178, then the width boundaries of the area of interest are defined by locations of the first anchor image and the second, width anchor image at 179.

Figure 14:
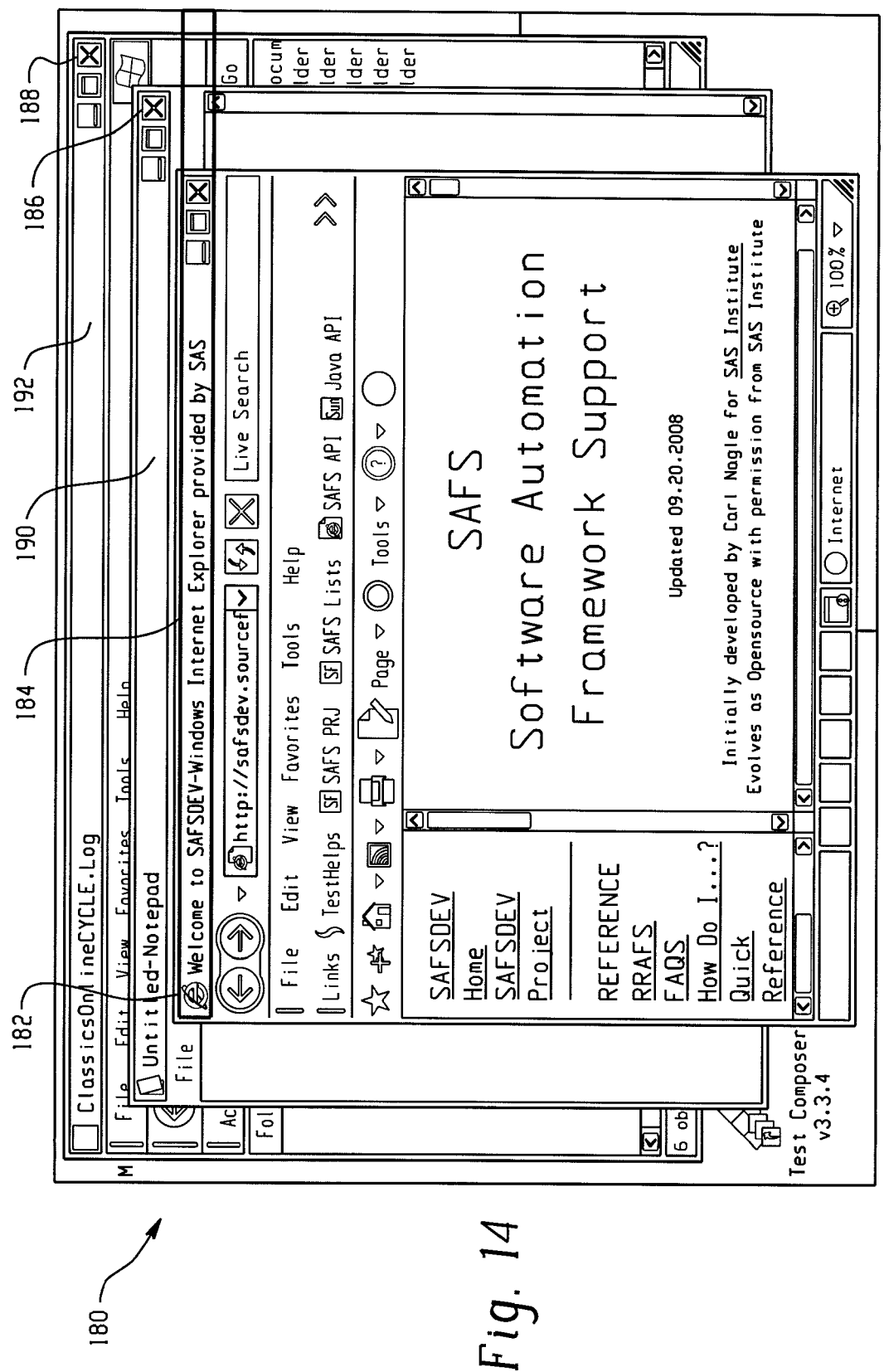
FIG. 14 depicts a limited scope width search for a second anchor image.

FIG. 14 depicts such a limited scope width search for a second anchor image. The limited scope width search begins after locating the first anchor image at 182. Because an 'X' button for a window is located substantially to the right of a window identifier icon (e.g., the Internet Explorer™ logo at 182), the width search may be limited to a search area substantially to the direct right of the located first point 182, as indicated by the box at 184. Utilizing a limited scope width search may speed search time, by limiting the search area to the box at 184. Additionally, identification of false positives may be substantially avoided, as illustrated by the search area 184 not including the 'X' buttons at 186 and 188 for the other two windows 190 and 192 depicted on the display, respectively.

Figure 15:
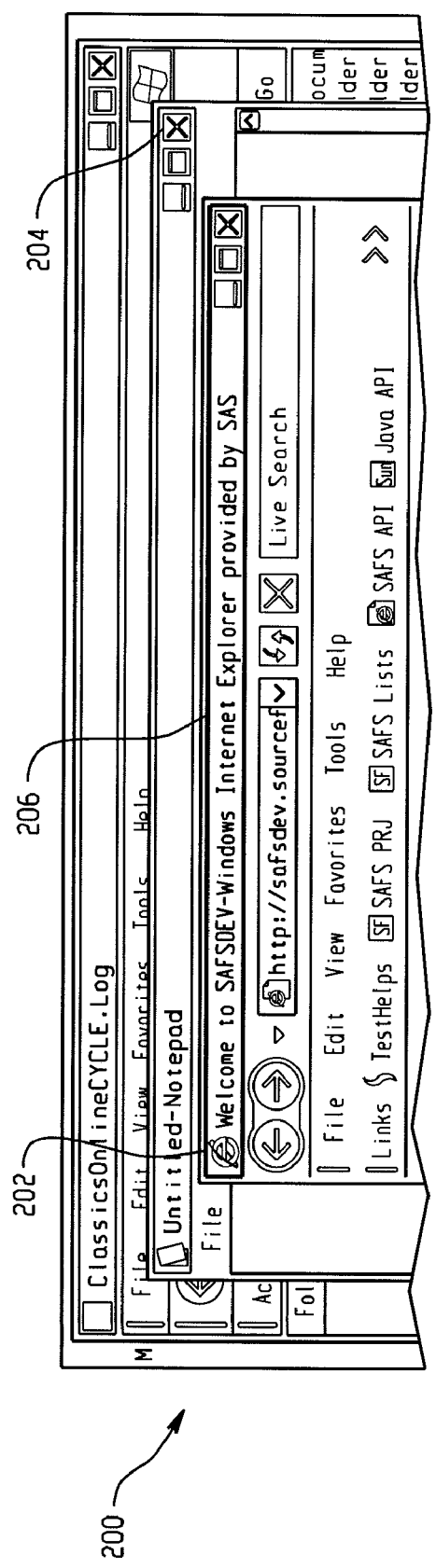
FIG. 15 depicts the identified width of the area of interest following location of the first and second anchor images.

FIG. 15 depicts the identified width of the area of interest following location of the first and second anchor images. The first anchor image is located at 202, identified as the first anchor point, and the second anchor image is located at 204, using for example, the limited scope width search described with respect to FIG. 14. The width for the area of interest may then be defined as the horizontal region between the first anchor point 202 and the second anchor point 202, as depicted by the box shown at 206. Location of the width of the area of interest could be accomplished using the following code fragment:

IExplorerTitlebar=Anchor=IExplorerAnchor;
    Width=TitlebarClose, where the 'X' button depicted in FIG. 12 is identified as "TitlebarClose."

Figure 16:
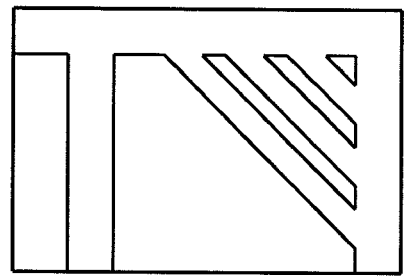
FIG. 16 depicts a third, height anchor image.

FIG. 16 depicts a third, height anchor image. The height anchor image corresponds to a sizing button for resizing a window. The sizing button is a common object that may appear on the bottom bar of multiple windows on the screen. Thus, a full screen scan for such an anchor image could prove ineffective at finding the desired image. However, execution of a limited scope height search, such as described with respect to FIG. 17, may enable higher accuracy and speed in finding the desired second anchor image.

Figure 17:
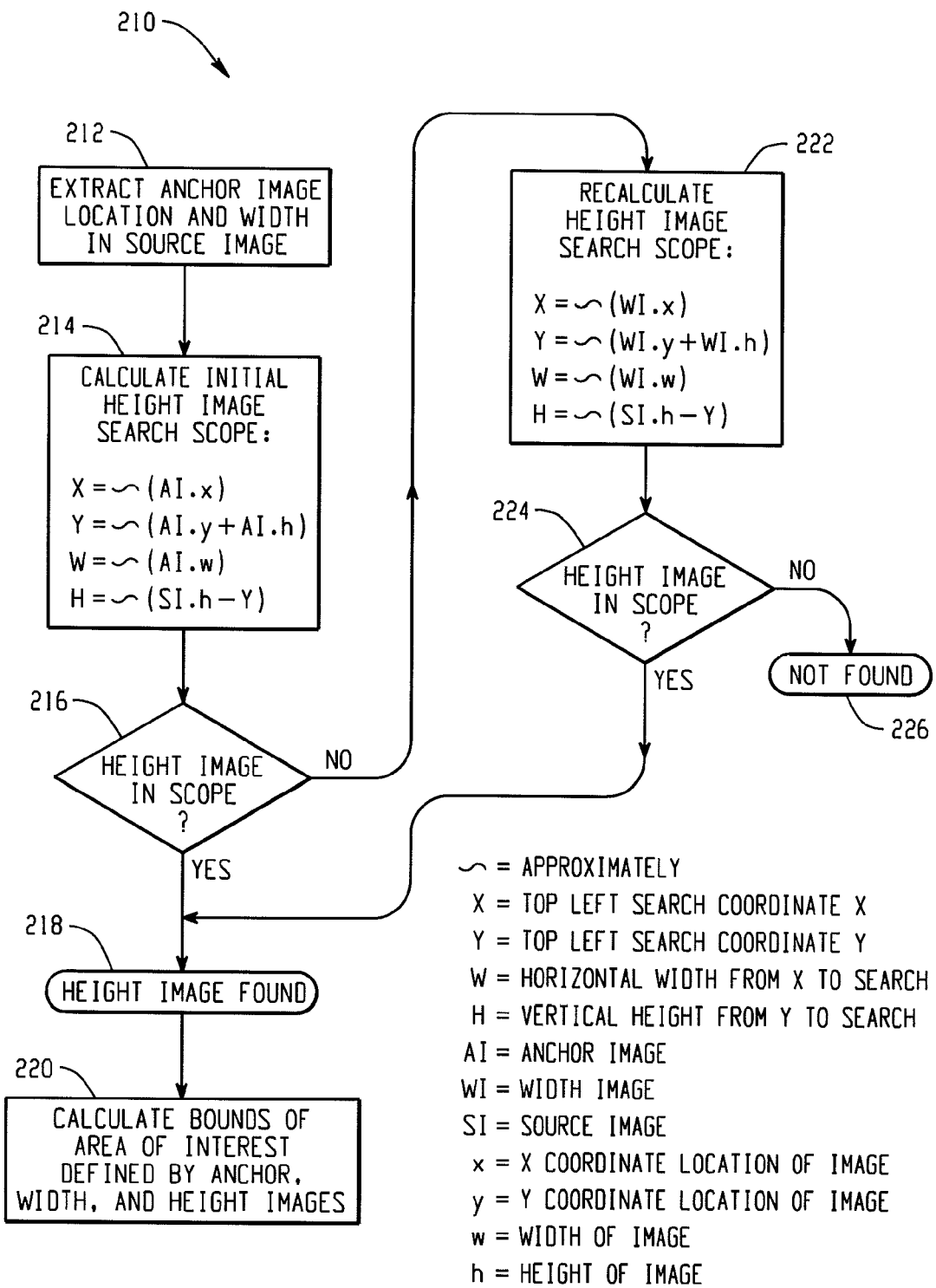
FIG. 17 is a flow diagram depicting steps of an example limited scope height search.

FIG. 17 is a flow diagram depicting steps of an example limited scope height search. At 212, the location and widths of a first anchor image and a second, width anchor image are identified. An initial height image search scope is calculated at 214. This initial height search scope corresponds with a search substantially below the first anchor image. The top left search coordinate, X,Y, is identified as the x-coordinate of the first anchor point and the y-coordinate of the first anchor point plus the height of the first anchor image, respectively. The width of the search scope is defined as the width of the first anchor image and the height of the search scope is calculated as the height of the source image minus the y-coordinate of the first anchor point minus the height of the first anchor image (e.g., the area of the source image below the first anchor image).

Following calculation of the height search scope, a search is performed for the height anchor image at 216. If the height anchor image is found at 218, the location is identified as a third anchor point, and the bounds of the area of interest may be defined by the first anchor point, the second, width anchor point, and the third, height anchor point at 220.

If the height anchor image is not found, then another limited scope height search is performed beginning with calculation of a new scope search at 222. The scope of the second search corresponds with the area substantially beneath the second, width anchor image. The top left search coordinate, X,Y, is identified as the x-coordinate of the second anchor point and the y-coordinate of the second anchor point plus the height of the second anchor image, respectively. The width of the search scope is defined as the width of the second anchor image, and the height of the search scope is calculated as the height of the source image minus the y-coordinate of the second anchor point minus the height of the second anchor image.

Following re-calculation of the height search scope, a second search is performed for the height anchor image at 224. If the height anchor image is found at 218, the location is identified as a third anchor point, and the bounds of the area of interest may be defined by the first anchor point, the second, width anchor point, and the third, height anchor point at 220.

Height anchor image searching may be modified if it is known whether the third, height anchor image is to be found at the bottom left or bottom right of the area of interest. If the height anchor image is to be found at the bottom left of the area of interest, then the scope calculations and searching may be limited to steps 214 and 216 of FIG. 17, corresponding to the area beneath the first anchor image. Alternatively, if the height anchor image is to be found at the bottom right of the area of interest, then the scope calculations and searching may be limited to steps 222 and 224 of FIG. 17, corresponding to the area beneath the second, width anchor image.

Figure 18:
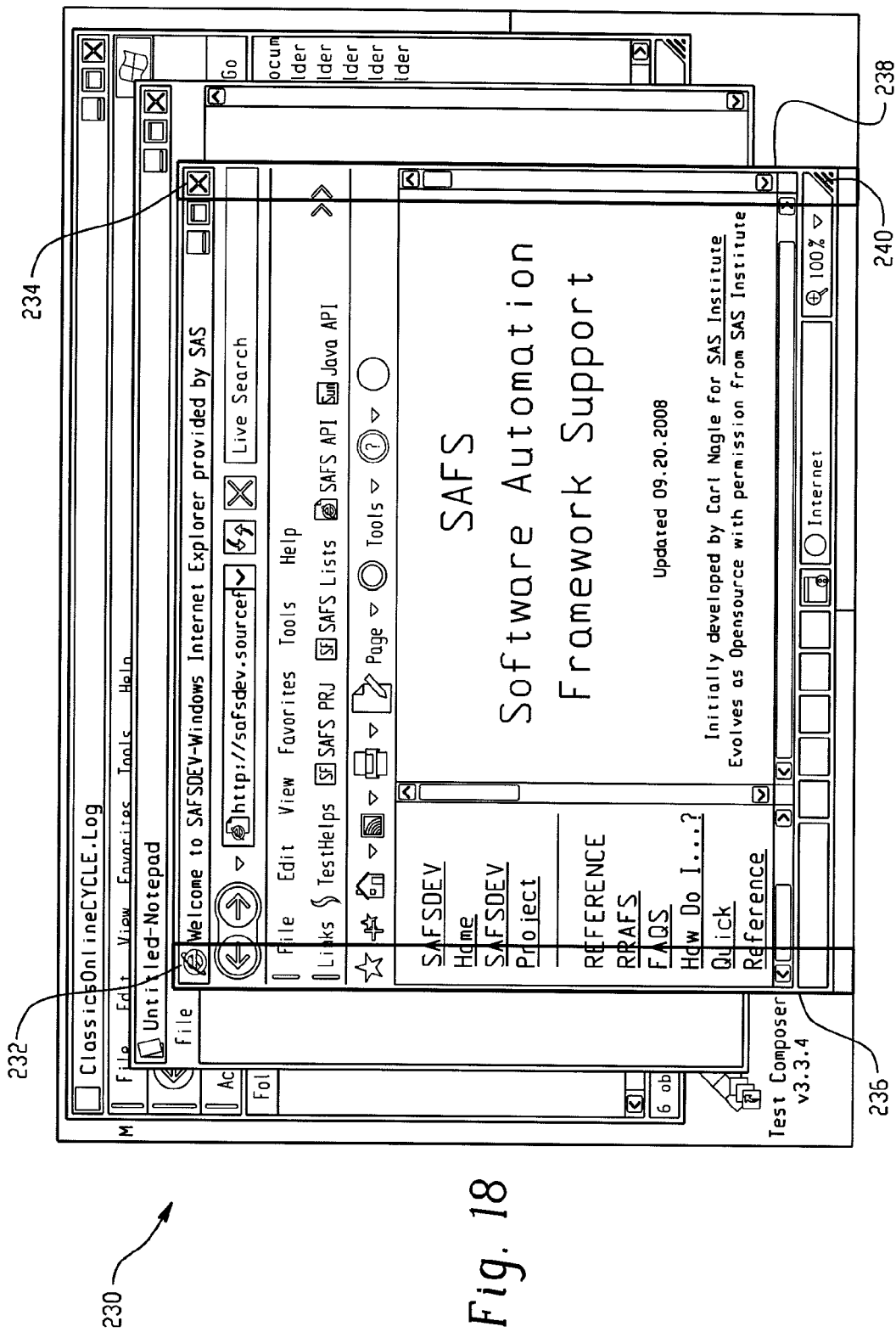
FIG. 18 depicts two limited scope height search areas.
Figure 19:
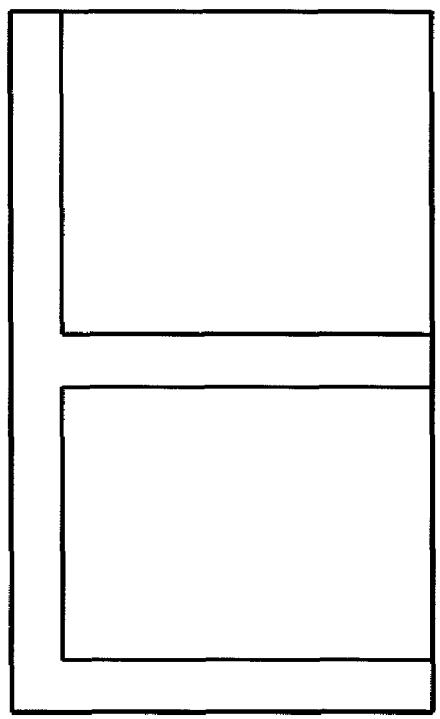
FIG. 19 depicts a second, height anchor image.

FIG. 18 depicts two limited scope height search areas. Located first and second anchor images are depicted at 232 and 234, respectively. A first limited scope height search area is depicted at 236. The first limited scope height search area corresponds with the area substantially beneath the first anchor image 232 and may be calculated according to step 214 of FIG. 17. A second limited scope height search area is depicted at 238. The second limited scope height search area may be calculated according to step 222 of FIG. 17 and corresponds with the area substantially beneath the second anchor image 234. If the anchor image depicted in FIG. 16 were provided as the third, height anchor image, then the example process of FIG. 17 would execute both the left and right limited scope height calculations and searches because the anchor image of FIG. 16 is found at the bottom right corner of the area of interest at 240. Location of the height of the area of interest could be accomplished using the following code fragment:

IExplorerTitlebar=Anchor=IExplorerAnchor;
    Width=TitlebarClose;Height=WindowResize,
where the sizing button depicted in FIG. 16 is identified as "WindowResize."

Figure 20:
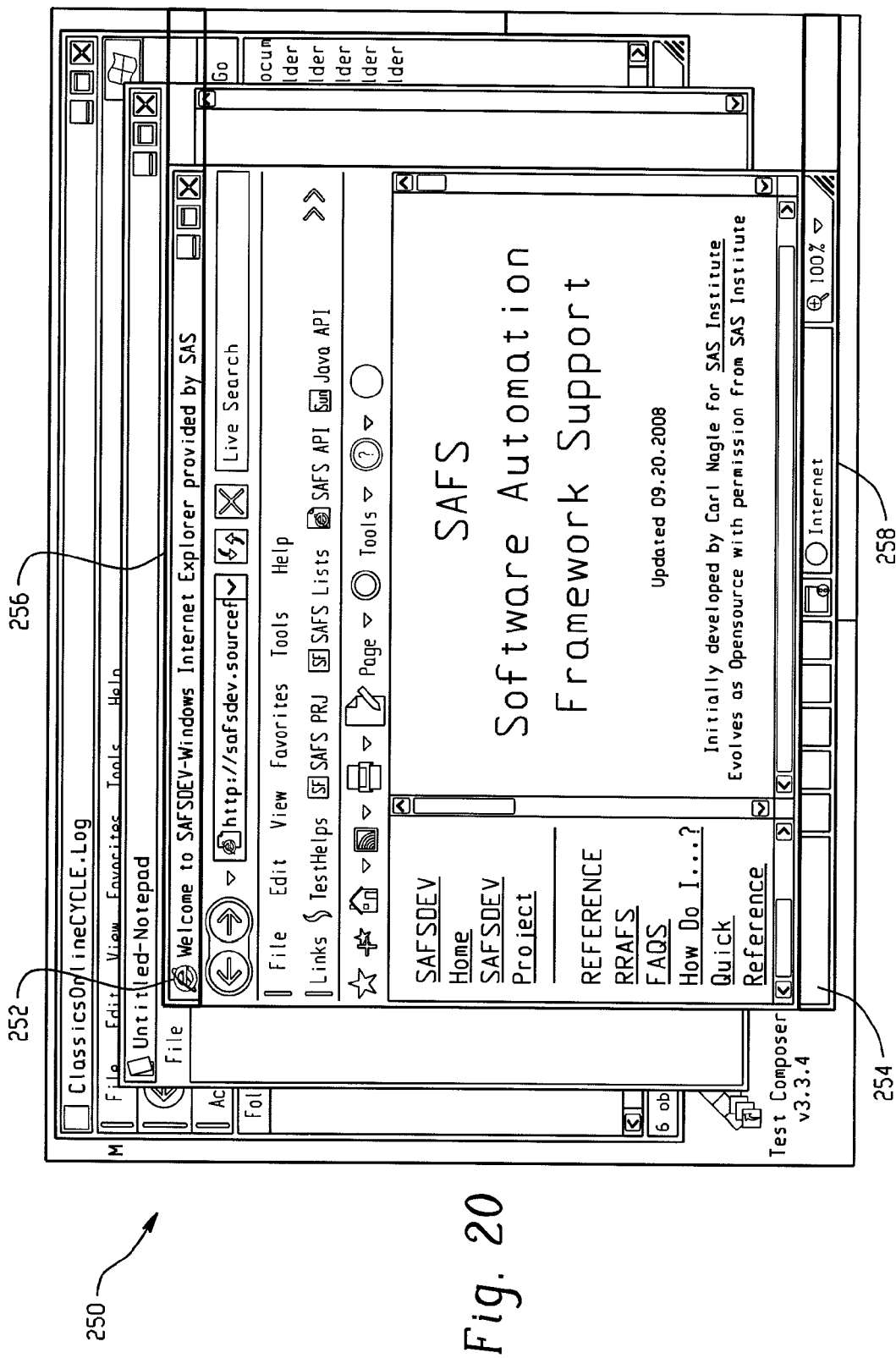
FIG. 20 depicts the limited scope, width search calculated following the location of the first anchor image and the second, height anchor image.

FIGS. 19-22 depict an example process for defining areas of interest in which to locate a target position and where the height of the area of interest is determined followed by the width. The example of FIGS. 19-22 utilizes the first anchor image depicted in FIG. 12 and the second, height anchor image depicted in FIG. 19 to determine the location and height of the area of interest. FIG. 20 depicts the limited scope, width search being calculated following the location of the first anchor image 252 and the second, height anchor image 254. With knowledge of the height boundaries of the area of interest, a third, width anchor image may be searched for substantially to the right of each of the first anchor image 252 in area 256 and the second anchor image 254 in area 258.

Figure 21:
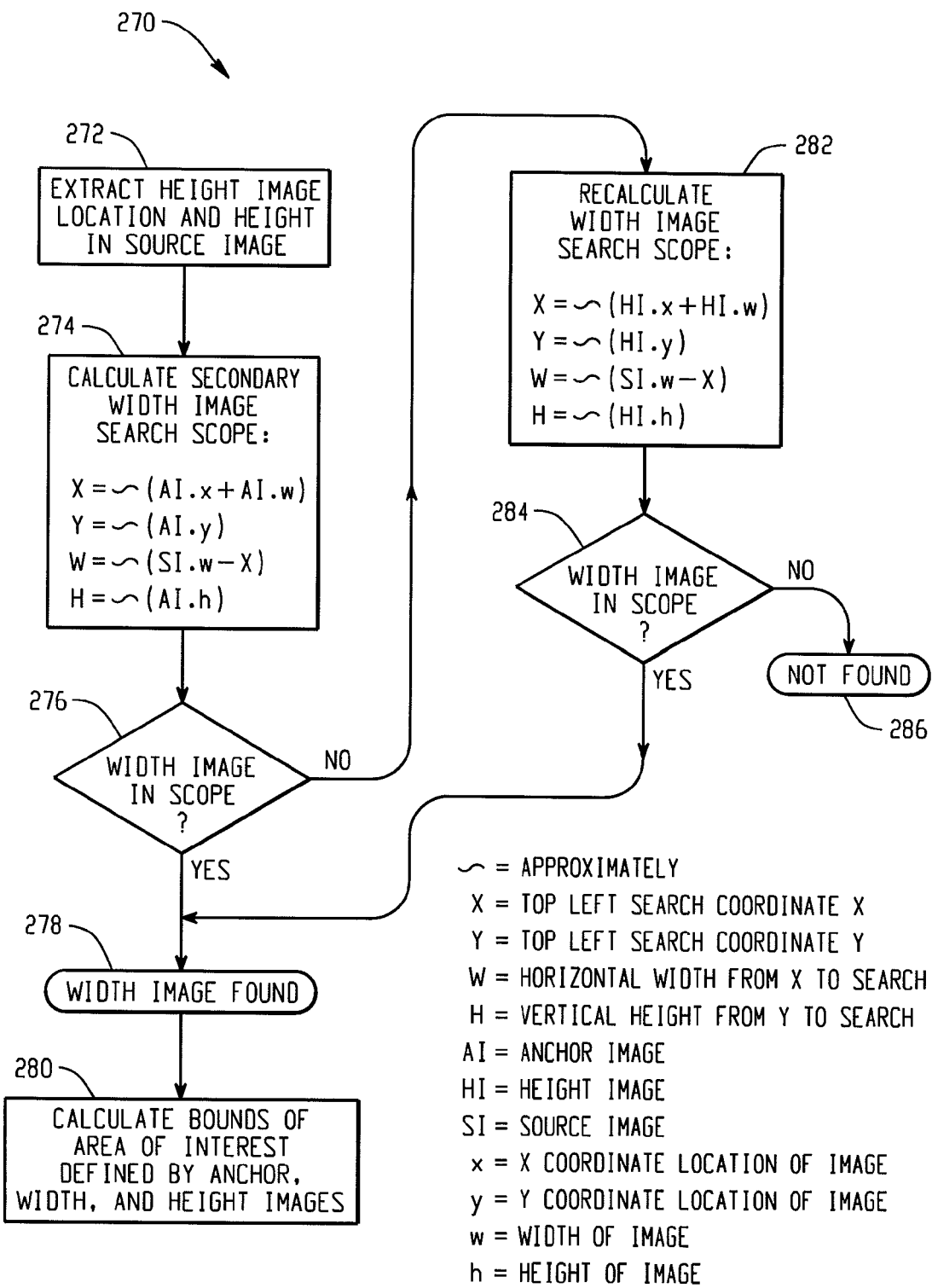
FIG. 21 is a flow diagram depicting steps for calculating limited scope search areas.

FIG. 21 is a flow diagram depicting steps for calculating the limited scope search areas depicted in FIG. 20. After locating the first anchor image and the second, height anchor image in step 272, the scope of a first limited search area is calculated at 274. The top left search coordinate, X,Y, is calculated as the x-coordinate of the located first anchor image plus the width of the first anchor image and the y-coordinate of the first anchor image, respectively. The width of the search area is calculated as the width of the source image minus the calculated X coordinate, and the height of the search area is defined as the height of the located first anchor image. The defined area is searched at 276, and if the third, width anchor image is found at 278, then the bounds of the area of interest may be calculated based on the locations of the first, second, and third anchor images at 280. If the third, width anchor image is not found in the first search area, then a second search area, corresponding to area 258 in FIG. 20, is calculated at 282. The top left search coordinate, X,Y, is calculated as the x-coordinate of the located second, height anchor image plus the width of the second, height anchor image and the y-coordinate of the second, height anchor image, respectively. The width of the search area is calculated as the width of the source image minus the calculated X coordinate, and the height of the search area is defined as the height of the located second, height anchor image. The newly defined search area is examined for the third, width anchor image at 284. If it is not found, an indicator of such is returned at 286. If the third anchor image is located, then the bounds of the area of interest are calculated based on the locations of the first, second, and third anchor images at 280. Similar to the limited scope height searches, the flow diagram for finding a third anchor image could be modified if it is known that the third anchor image will be found at the top or bottom of the area of interest.

Figure 22:
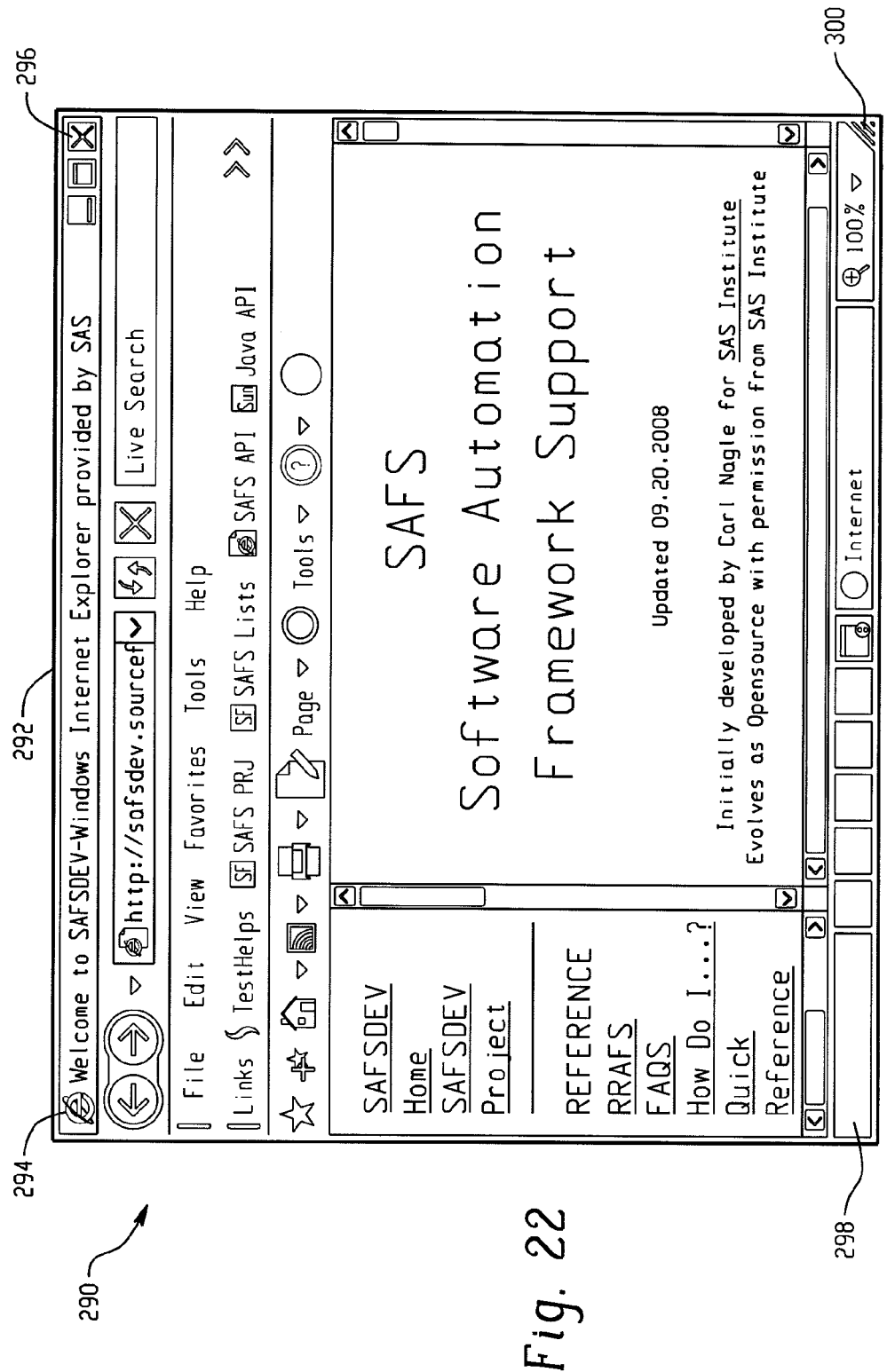
FIG. 22 depicts an identified area of interest following location of anchor points.

FIG. 22 depicts an identified area of interest following location of anchor points. The area of interest could be defined by a variety of combinations of located anchor points. For example, locating any three corner anchor points 294, 296, 298, 300 would be sufficient for defining a rectangular area of interest. Alternatively, locating any two diagonal corner anchor images (i.e., 294 and 300 or 296 and 298) would also give sufficient data points for defining a rectangular area of interest. An area of interest may also be partially defined by two collinear anchor points. The choice of whether to use two or three anchor images involves a balancing of speed and accuracy. While it may take more time to locate three anchor points, a three anchor point search is able to take advantage of the limited scope search accuracy and efficiency benefits described above. On the other hand, a two anchor point search could be accomplished in one traverse of the source image but may result in false positive identifications of erroneous anchor images.

Figure 23:
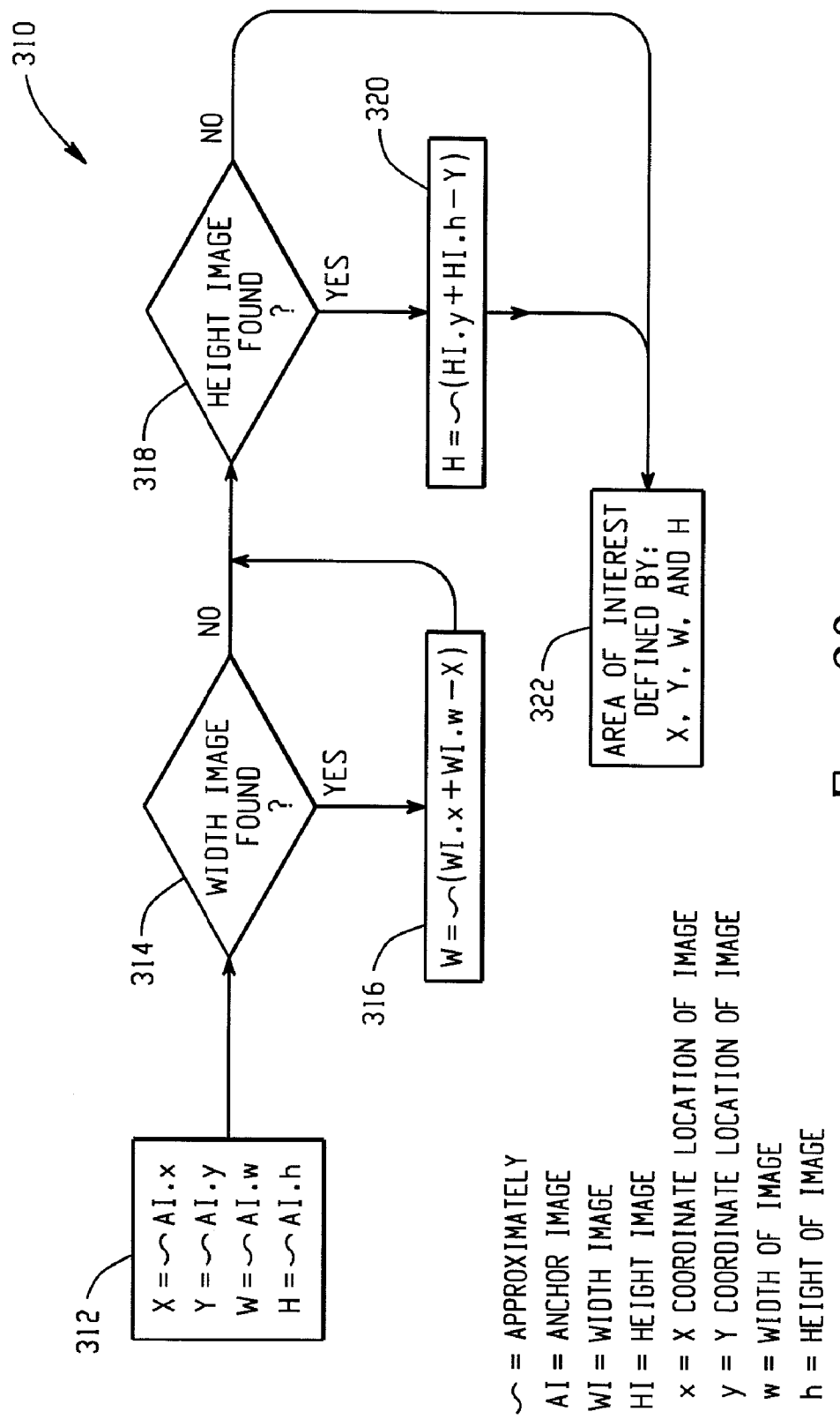
FIG. 23 is a flow diagram depicting steps for defining an area of interest using one, two (non-diagonal), or three anchor points.

FIG. 23 is a flow diagram depicting steps for defining an area of interest using one, two (non-diagonal), or three anchor points. The area of interest may be defined by the X,Y location of the upper left corner and a width and a height. The area of interest is initially defined at 312 as the X,Y location of the first anchor point with a width equal to the width of the anchor image and a height equal to the height of the anchor image, making the area of interest equal to the first anchor image itself on the source image. If a width anchor image was located at 314, then the width of the area of interest is changed to reflect the x-coordinate of the located width anchor image plus the width of the width anchor image minus the calculated X position of the area of interest at 316. If a height anchor image was located at 318, then the height of the area of interest is changed to reflect the y-coordinate of the located height anchor image plus the height of the height anchor image minus the calculated Y position of the area of interest at 320. The area of interest defined by X,Y,W, and H may then be returned at 322.

Figure 24:
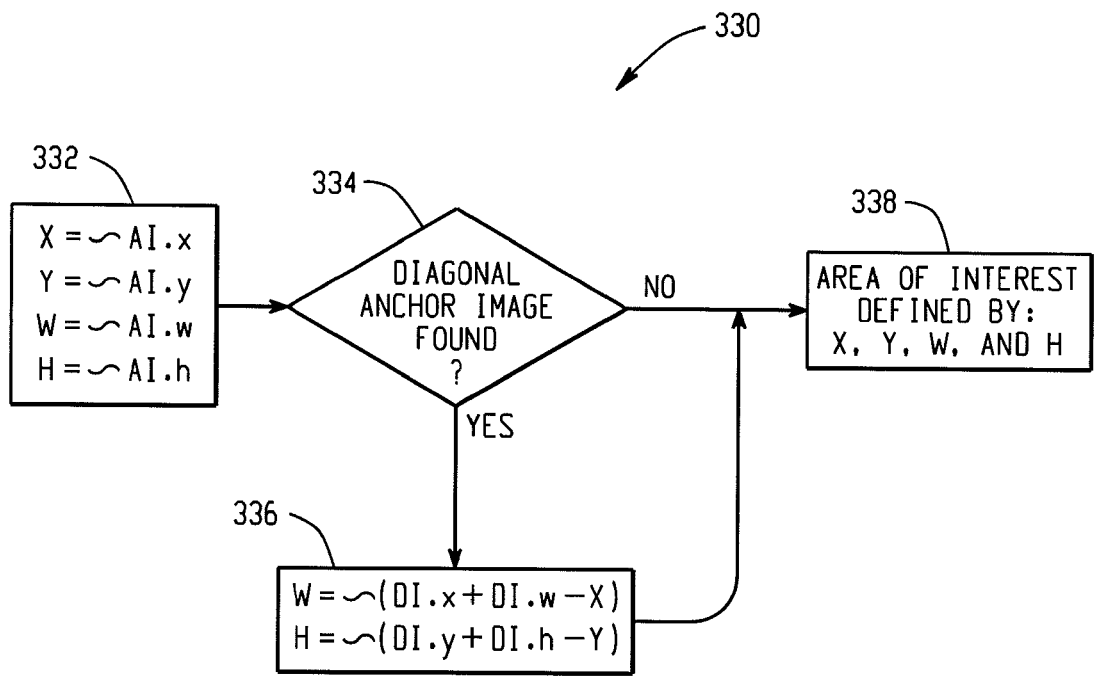
FIG. 24 is a flow diagram depicting steps for defining an area of interest using two diagonal anchor points.

FIG. 24 is a flow diagram depicting steps for defining an area of interest using two diagonal anchor points. Having found a first anchor point and a second, diagonal anchor point, the area of interest is initially defined at 332 as the X,Y location of the first anchor point with a width equal to the width of the anchor image and a height equal to the height of the anchor image, making the area of interest equal to the first anchor image on the source image itself. If a second, diagonal anchor image has been found 334, then the width of the area of interest is changed to reflect the x-coordinate of the located diagonal anchor image plus the width of the diagonal anchor image minus the calculated X position of the area of interest at 336. Additionally, the height of the area of interest is changed to reflect the y-coordinate of the located diagonal anchor image plus the height of the diagonal anchor image minus the calculated Y position of the area of interest. The area of interest defined by X,Y,W, and H may then be returned at 338.

After calculating the location and dimensions of an area of interest, subsequent searches for child points, components, elements, or areas of interest can be limited in scope to the parent area of interest. This may improve the accuracy of child searches because limiting the scope of the child search eliminates all possible false positive identifications in the source image that are not within the parent area of interest. Child searches may also be performed in less time because the area of interest is smaller than the entire source image.

Area of interest and other searches may be further refined through the inclusion of an additional area of interest parameters. For example, an index parameter may be included to instruct the hotspot locator to find the $n^{th}$ match of an anchor image. The command:

IExplorer2=Anchor=IExplorerAnchor;Index=2 would locate the second instance of the IExplorerAnchor image within the current search scope and return its location to the IExplorer2 variable.

As another parameter example, for a specified target image, the search scope may be further limited to a specific area within the current scope. The values defining these areas may be either absolute values or relative values. An example rectangle command would specify the X,Y location of the upper left corner of the rectangle relative to the current search scope along with the width and height of the rectangle.

Figure 25A:
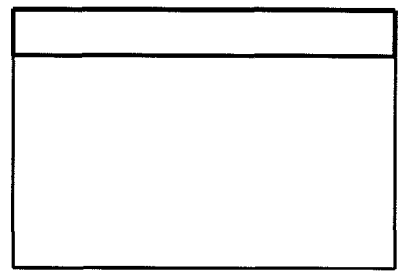
FIGS. 25A-25D depict example rectangle definitions within a search area.

FIGS. 25A-25D depict example rectangle definitions within a search area. FIG. 25A limits the height of the search scope to the top 50 pixels and the full width of the current scope in searching for the IExplorerIco image, as illustrated by the command:

Item=Anchor=IExplorerIco;Rectangle=0, 0, 100%, 50.

Figure 25B:
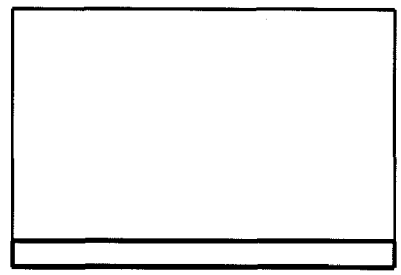

FIG. 25B limits the height of the search scope to the bottom 10% and the full width of the current scope in searching for the TaskIco image, as illustrated by the command:

Taskbar=Anchor=TaskIco;Rectangle=0, 90%, 100%, 100%.

Figure 25C:
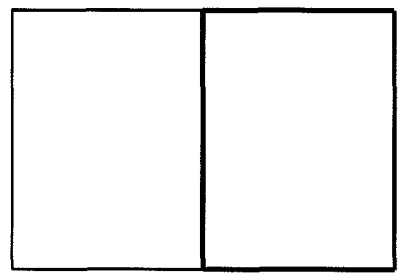

FIG. 25C limits the width of the search to the right side of the current scope in searching for the SideBarIco image, as illustrated by the command:

RightItem=Image=SideBarIco;Rectangle=50%, 0, 100%, 100%.

Figure 25D:
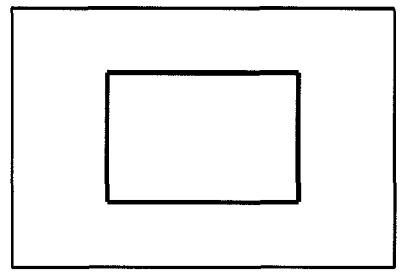

FIG. 25D limits the search to the center 50% of the current scope width and height in searching for the MBoxAnchor image, as illustrated by the command:

Message=Image=MBoxAnchor;Rectangle=25%, 25%, 75%, 75%.

Figure 26A:
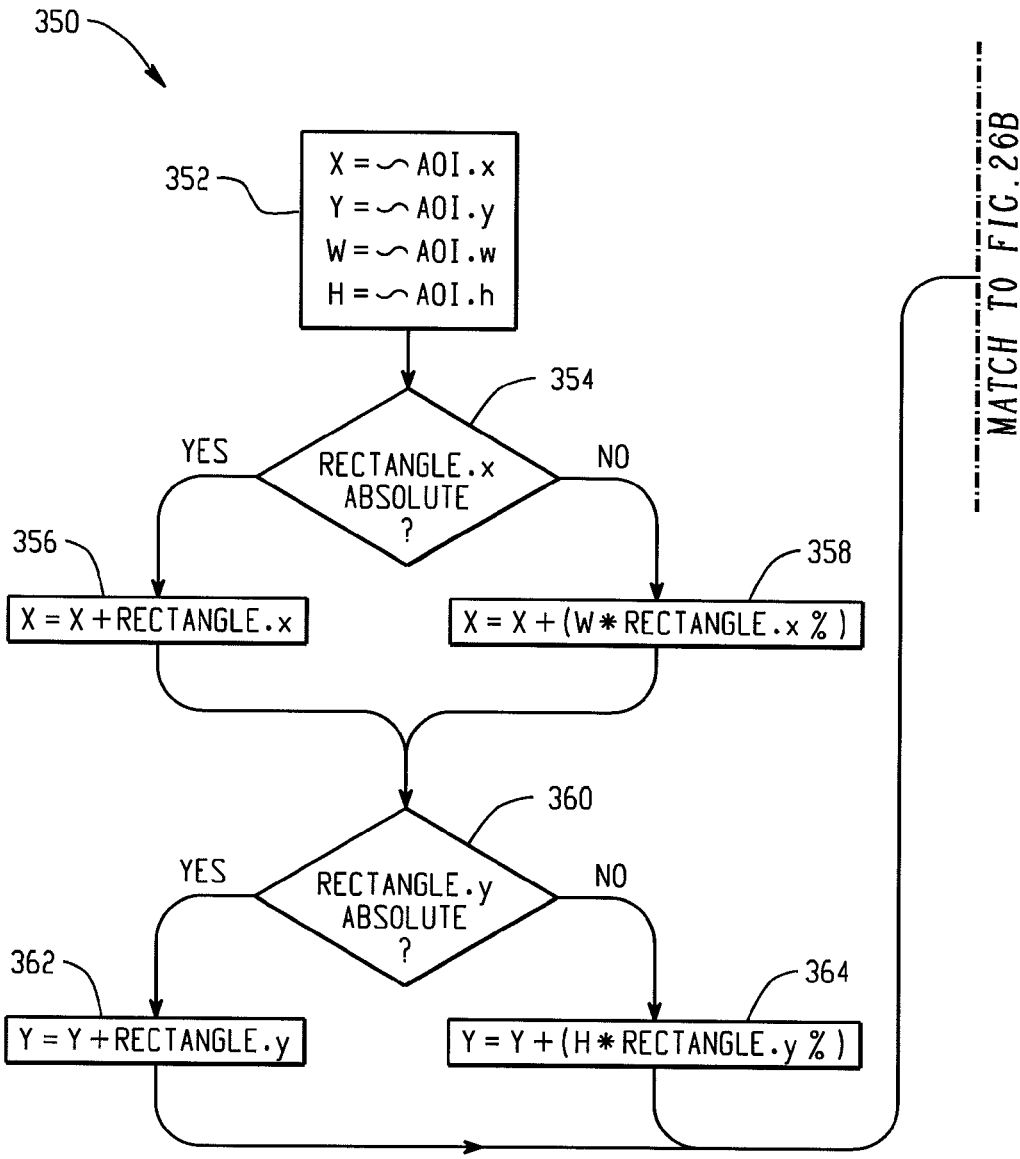
FIGS. 26A-26B are a flow diagram depicting steps for defining a search rectangle within a search scope.
Figure 26B:
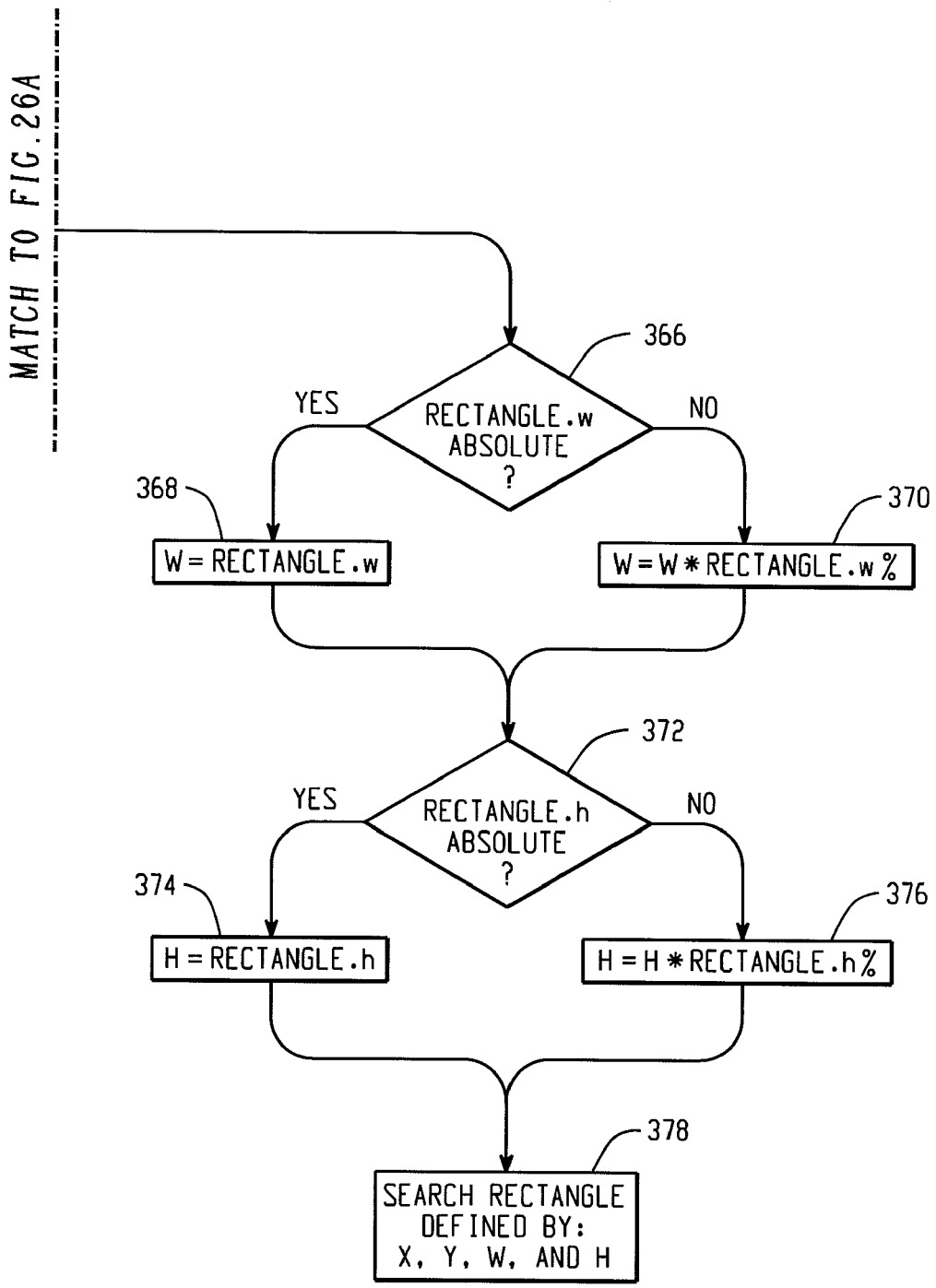

FIGS. 26A-26B are a flow diagram depicting steps for defining a search rectangle within a search scope. The search scope is initially defined as the current area of interest at 352. This current area of interest may be the entire source image or a portion thereof. If a rectangle X offset has been defined as an absolute value at 354, then the X component of the search rectangle is calculated as X plus the rectangle X offset absolute value at 356. If the rectangle X offset is instead defined as a percentage, then the X component of the search rectangle is calculated as the width of the area of interest times the rectangle X offset percentage, plus X at 358. If a rectangle Y offset has been defined as an absolute value at 360, then the Y component of the search rectangle is calculated as Y plus the rectangle Y offset absolute value at 362. If the rectangle Y offset is instead defined as a percentage, then the Y component of the search rectangle is calculated as the height of the current area of interest times the rectangle Y offset percentage, plus Y at 364.

If a rectangle width offset has been defined as an absolute value at 366, then the width component of the search rectangle is calculated as the defined width absolute value at 368. If the rectangle width is defined as a percentage, then the width value is calculated as the width of the area of interest times the defined width percentage at 370. Similarly, if a rectangle height offset has been defined as an absolute value at 372, then the height component of the search rectangle is calculated as the defined height absolute value at 374. If the rectangle width is instead defined as a percentage, then the height value is calculated as the height of the area of interest times the defined height percentage at 376. Following calculation of the X,Y,W, and H components, the search rectangle may be defined by the combination of those components.

As described above, it is often desirable to identify a specific or relative point or hotspot on which specific actions will be performed. By identifying such hotspots within previously determined areas of interest, accuracy in determining correct hotspot locations may be increased. Hotspots may be determined by performing a target image search within an area of interest. Hotspots may also be defined as a distance offset from a relativity point. Relativity may default to the center of an area of interest. Additionally, a hotspot may default to the center of an area of interest, unless instructed otherwise, via command or as a result of a target image search.

Figure 27A:
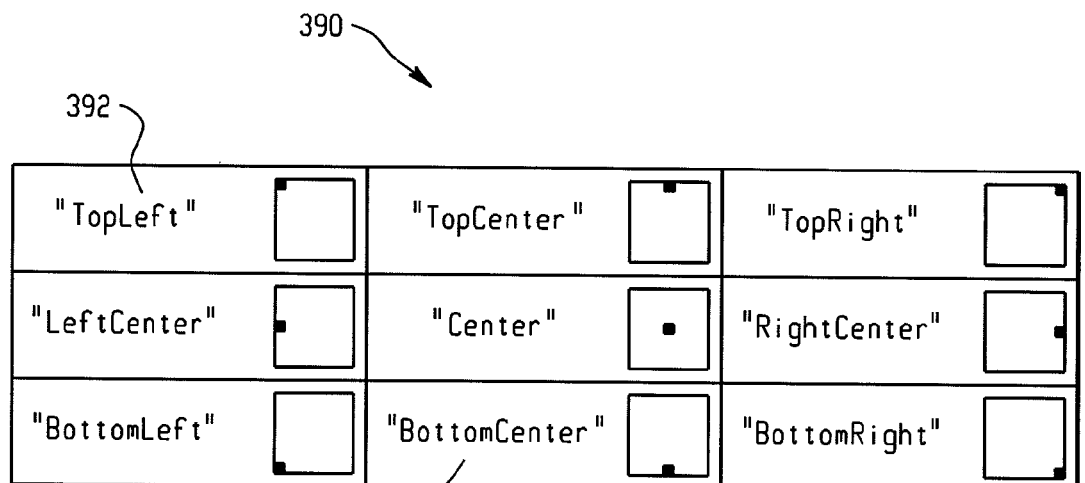
FIGS. 27A-27C depict hotspot locations based on relativity points and offsets.
Figure 27B:
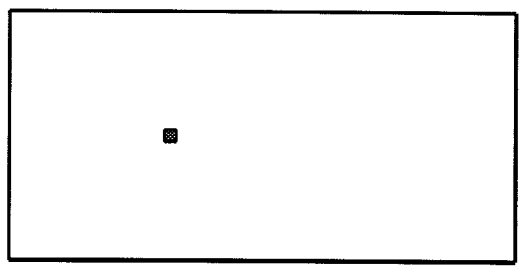
Figure 27C:
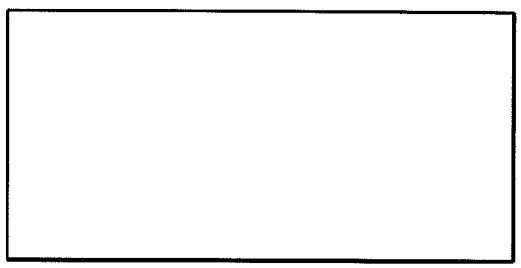

FIGS. 27A-27C depict hotspot locations based on relativity points and offsets. FIG. 27A depicts a plurality of commandable relativity points from which to define a hotspot. For example, to define a hotspot as the TopLeft of an area of interest, the TopLeft command may be utilized, as illustrated at 392 and recited below:

Item=Anchor=Image1;Relative=TopLeft.

Alternatively, the BottomCenter command may be utilized, as shown at 394 and recited below, to set a relativity point at the bottom center of the area of interest:

Item=Anchor=Image1;Relative=BottomCenter.

Additionally, a hotspot may be defined using an X,Y offset from the relativity point. These offsets may be positive or negative and may not be confined by the area of interest. For example, FIG. 27B depicts a hotspot definition at 10 pixels to the left of the default relativity point of the center of the area of interest by commanding:

Item=Image=Image1;Hotspot=−10, 0.

FIG. 27C depicts a hotspot definition at 40 pixels to the left of the default relativity point and 20 pixels below the center of the area of interest, positioning the hotspot outside of the area of interest, using the command:

Item=Anchor=Image1;Hotspot=−40, 20.

Hotspots may also be used in conjunction with relativity point settings, as illustrated by the command:

Item=Image=Image1;Hotspot=−10, 0;Relative=LeftCenter, which would place the hotspot 10 pixels to the left of the left center relativity point.

Figure 28:
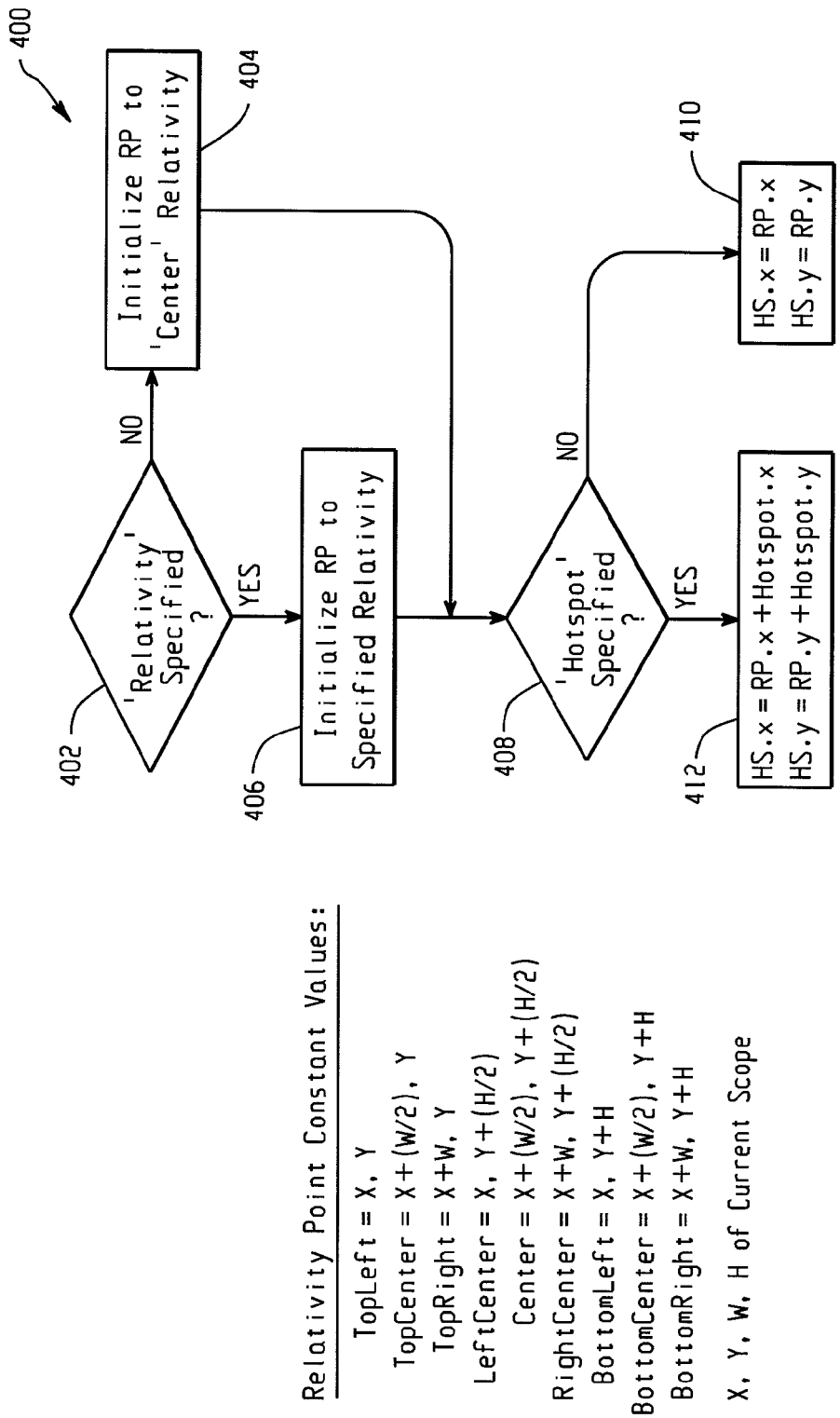
FIG. 28 is a flow diagram depicting steps for calculating a hotspot based on relativity point constraints.

FIG. 28 is a flow diagram depicting steps for calculating a hotspot based on relativity point constraints. At 402, an inquiry is made as to whether a relativity is specified. If a relativity is not specified, then the relativity point is set to the default 'Center' relativity point at 404. If a relativity point is specified, then the relativity point is set to the specified position at 406. At 408, an inquiry is made as to whether a hotspot offset is defined. If a hotspot offset is not defined, then the hotspot point is set to the relativity point by default at 410. If a hotspot offset is defined, then the hotspot offset is applied to the relativity point, as shown at 412.

Figure 29:
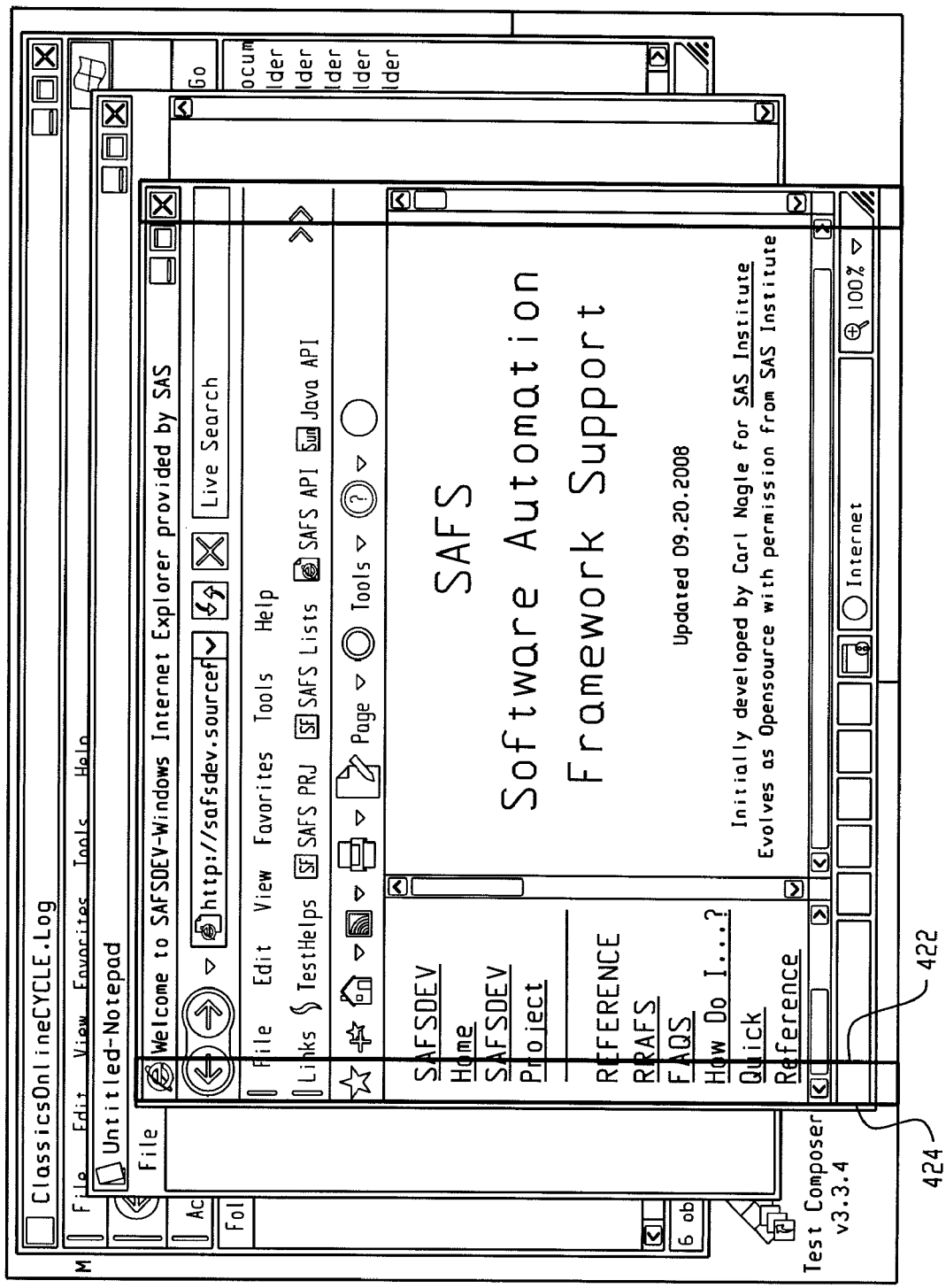
FIG. 29 depicts two limited scope search areas below the width of the first and second anchor images.
Figure 30:
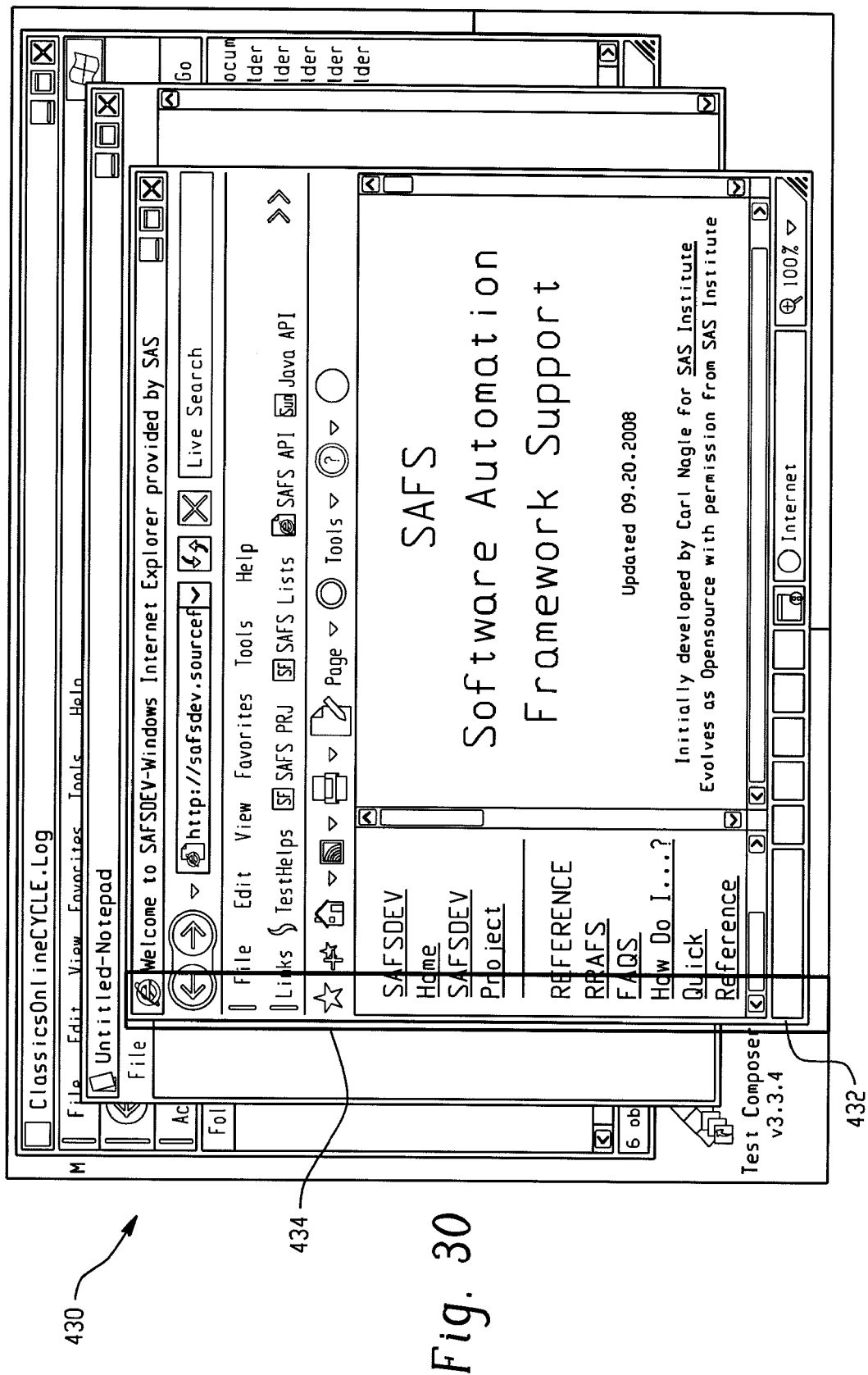
FIG. 30 depicts a limited scope search area having an added outset.

Parameters may also be included to better customize limited scope searches. For example, in the example described with respect to FIG. 18, upon locating a first anchor point, and a second anchor point, a limited scope height search may be performed of the areas directly below the located anchor images for a third, height anchor point, such as one of those depicted in FIGS. 16 and 19. FIG. 29 depicts a potential problem, where the area below the width of the first and second anchor image does not include the third, height anchor image. For example, the limited scope search area shown at 422 excludes the left edge of the sought after third, height anchor image of FIG. 19 at 424. To aid finding the third anchor image, an outset may be added to the limited scope search area. FIG. 30 depicts a limited scope search area having an added outset. By adding a width outset to each side of the limited scope search area depicted at 434, the entire sought after third, height anchor image, shown at 432, falls within the limited scope search area, ensuring that the third anchor image will be found. The above described outset could be implemented using the command:

Image=Image1;Height=Image2;Outsets=10, 0, 10, 0.

Figure 31:
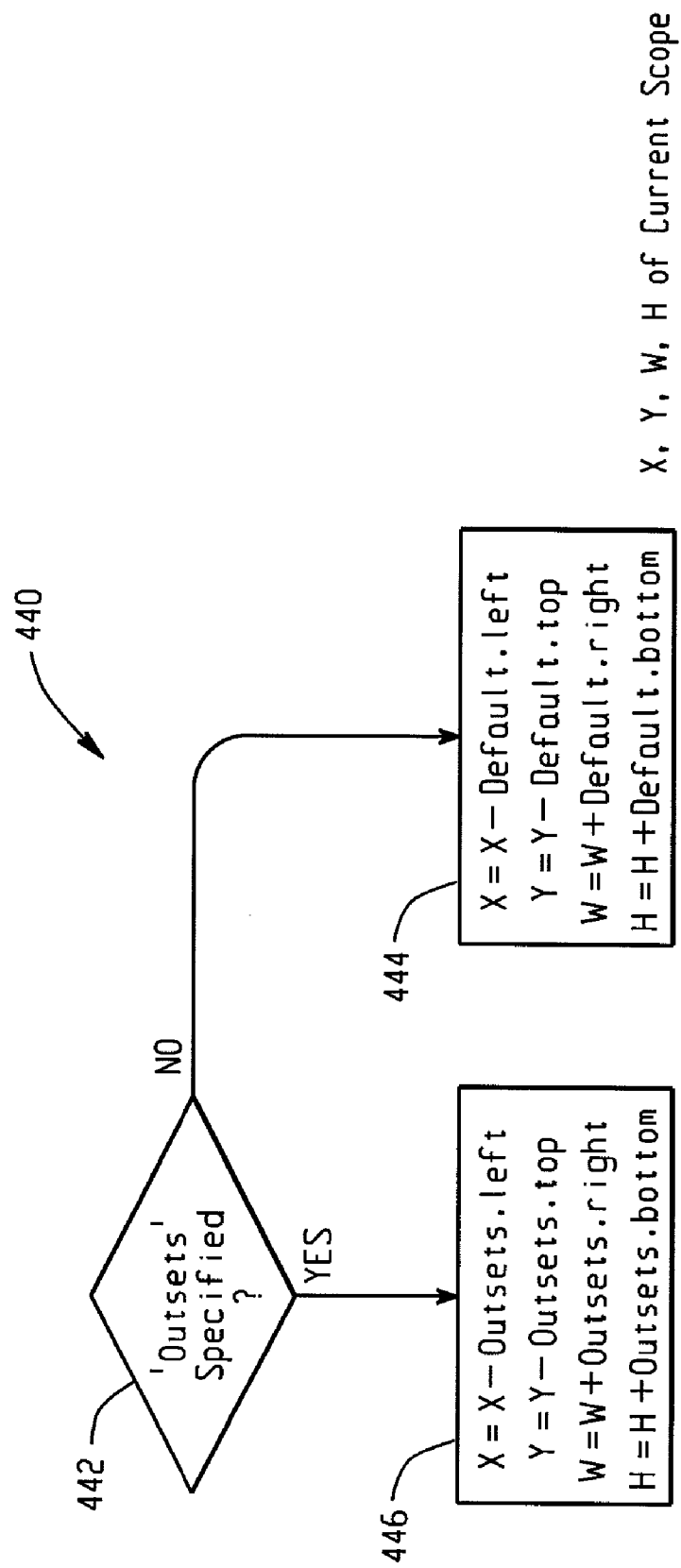
FIG. 31 is a flow diagram depicting steps for applying an outset to a limited scope search area.

FIG. 31 is a flow diagram depicting steps for applying an outset to a limited scope search area. At 442, an inquiry is made as to whether an outset is specified. If an outset is not specified, then a default outset, which may be zero, may be applied to each of the X,Y,W, and H parameters of the limited scope search area at 444. If outsets are specified, then the specified outsets are applied to the limited scope search area, as depicted at 446. Outsets may also be applied to areas of interest.

Figure 32:
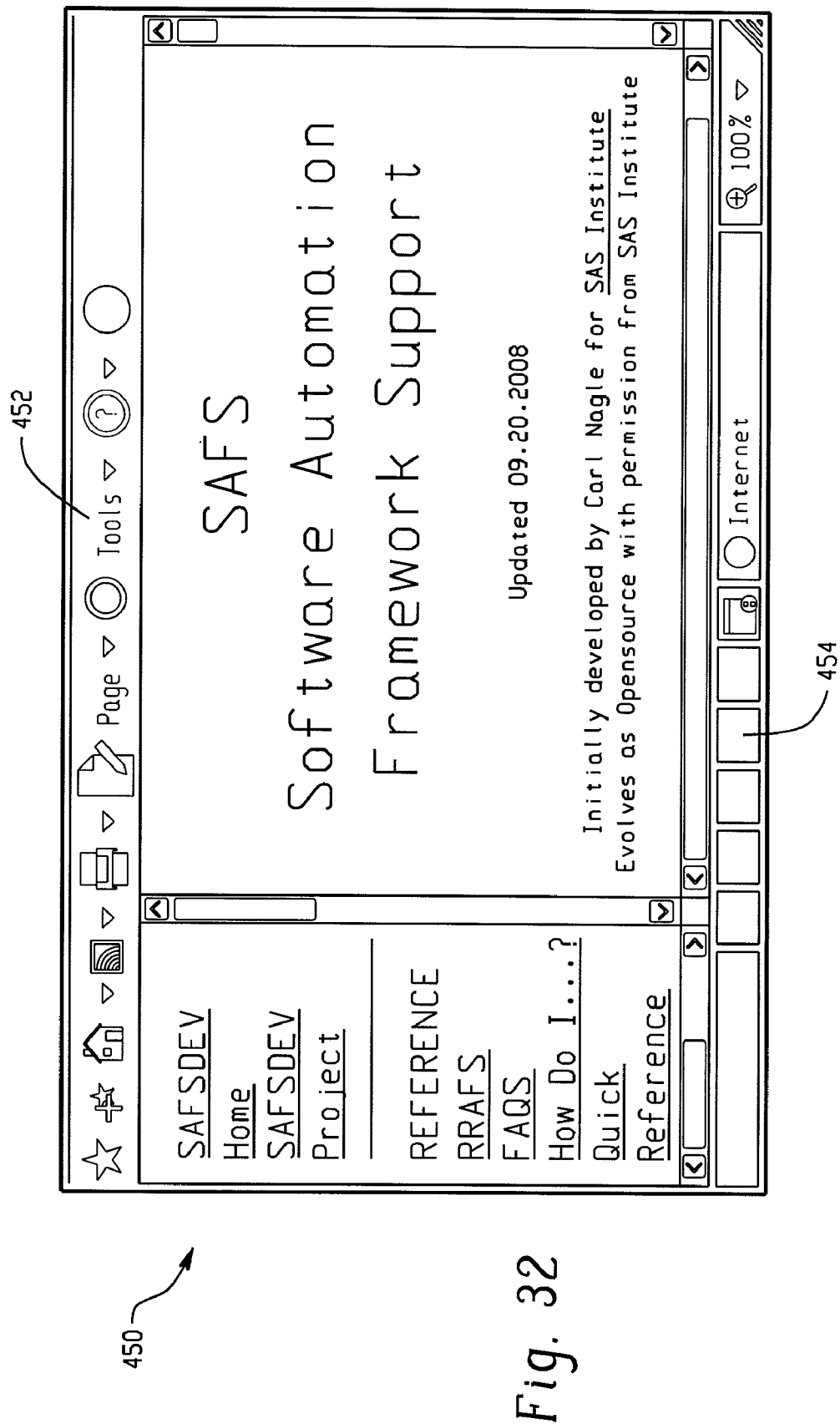
FIG. 32 depicts an area of interest.

Similarly, insets may be applied to an area of interest or search areas. FIG. 32 depicts an area of interest. The area of interest depicted in FIG. 32 includes a toolbar 452 and a status bar 454 that one may wish to exclude from future operations. By applying an inset to the area of interest, internal margins may be added to the area of interest, excluding these undesirable artifacts.

Figure 33:
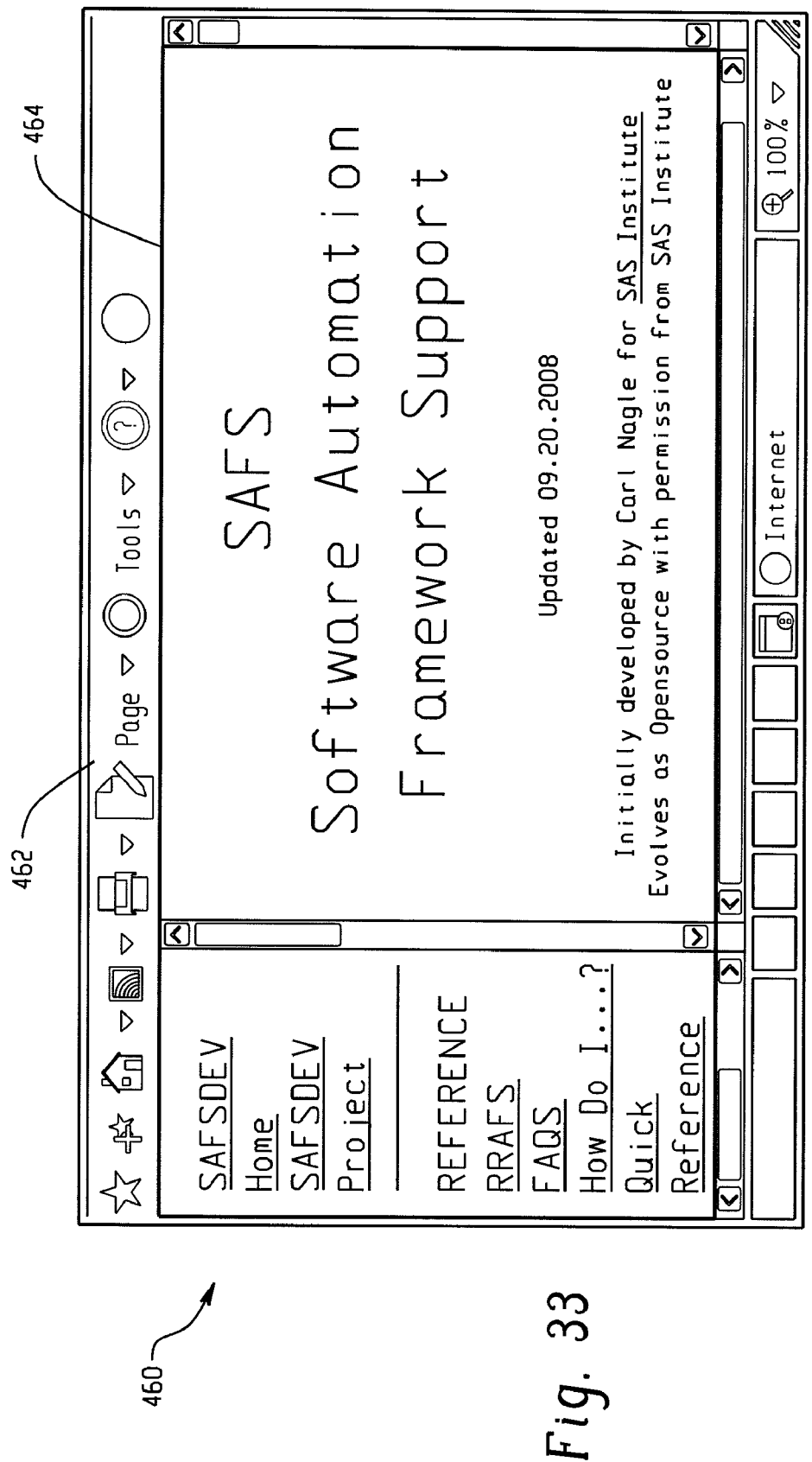
FIG. 33 depicts an area of interest having been limited by application of an inset.

FIG. 33 depicts an area of interest which has been limited by application of an inset. The original area of interest is the entire depicted display 462. By applying an inset of 15 pixels in the Y direction, 10 pixels to the width field, and 15 pixels to the height field, the new area of interest, highlighted at 464 is generated. This new area of interest could be created using the following command:

Item=Image=Image1;Width=Image2;Height=Image3;Insets=0, 15, 10, 15.

Figure 34:
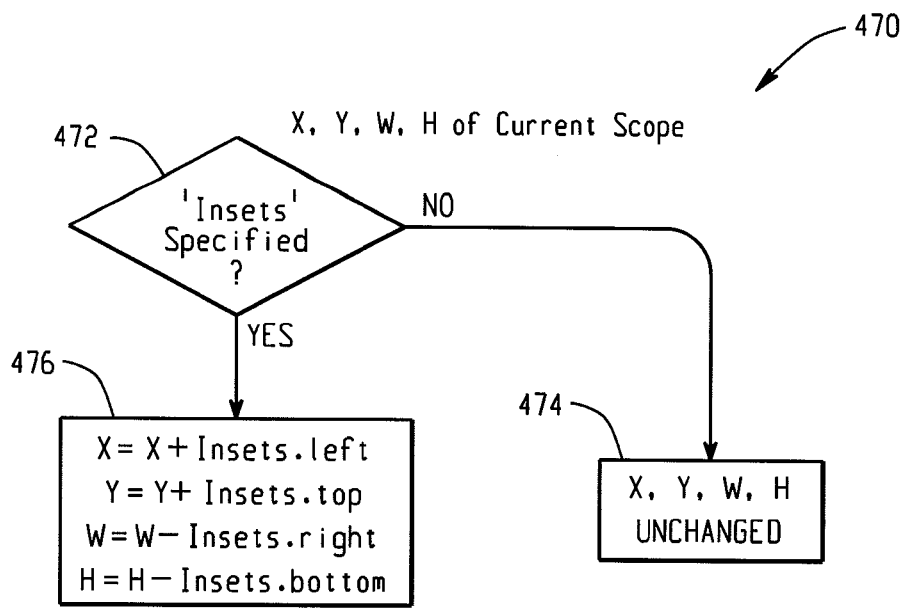
FIG. 34 is a flow diagram depicting steps for modifying an area of interest or limited scope search area based on an inset definition.

FIG. 34 is a flow diagram depicting steps for modifying an area of interest or limited scope search area based on an inset definition. At 472, an inquiry is made as to whether an inset has been specified. If no inset has been specified, then the dimensions of the area of interest or search area are unchanged at 474. If insets are specified, then the X,Y,W, and H parameters are modified to reflect the defined inset values at 476.

Additionally, masks may be applied to target and anchor images to be searched to specify which portions of the search image are to be matched in the source image. A mask may include a two-color image, often black and white, containing mask information for the image being sought. The mask image and the image being sought are often the same size. Masks are useful for ignoring dynamic content in the source or target images such as time/date stamps or for ignoring areas of an image with differing background colors than the source. An example mask implementation may specify that a white pixel in the mask image means that the corresponding image in the sought after image should be matched in the source image. Conversely, a black pixel in the mask image denotes that the corresponding pixel in the target image should be ignored and not compared with the source image.

Figure 35:
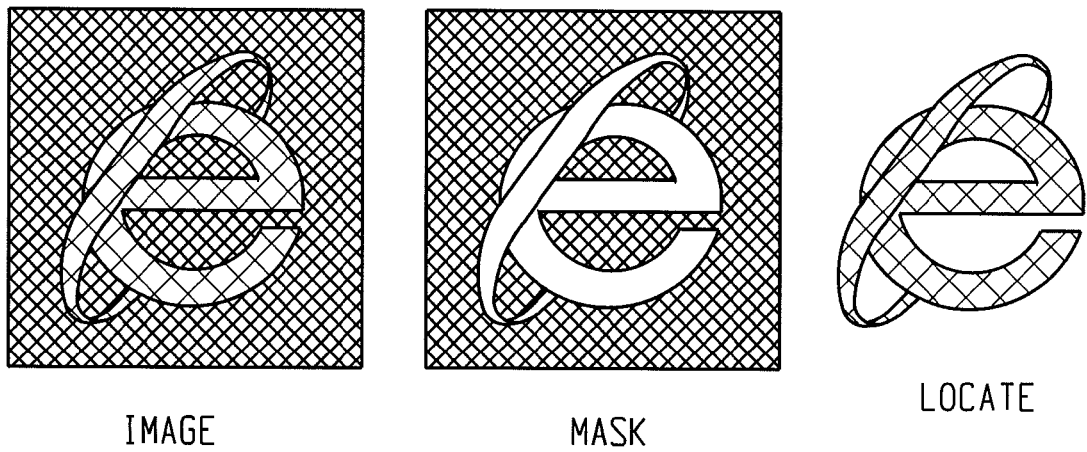
FIG. 35 depicts the effect of an image mask on a sought after image.

FIG. 35 depicts the effect of an image mask on a sought after image. The first image displays an Internet Explorer™ image having a dark background. A mask image is provided that contains white pixels and black pixels. White pixels correspond to pixels in the sought after image that should be matched in the source image. Black pixels may be ignored. Applying the mask to the image results in the locate image. The locate image includes only the pixels in the image corresponding to white pixels in the mask. The dark background pixels of the image have been removed. This enables the Internet Explorer™ image to be searched without regard to the background color behind the image.

Figure 36:
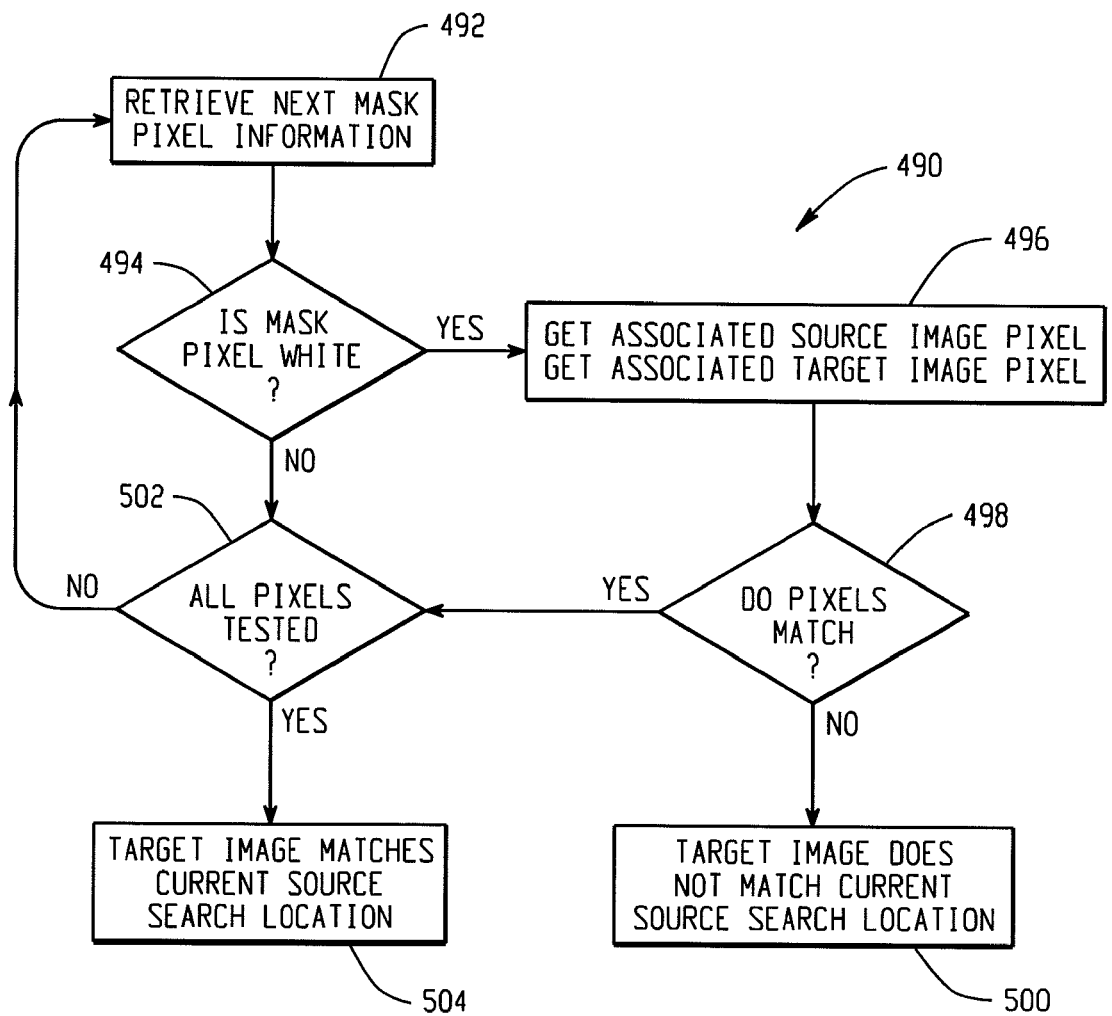
FIG. 36 is a flow diagram depicting steps for utilizing a pixel mask during an image comparison.

FIG. 36 is a flow diagram depicting steps for utilizing a pixel mask during an image comparison. A loop is performed for each pixel of a sought after image for each source search location. At 492, a mask pixel for the next pixel to be tested against the current source location is retrieved. An inquiry is made at 494 as to whether the pixel is white. If the mask pixel is white, then the associated source image pixel and target image pixel are retrieved at 496. If the source and target pixels do not match at 498, then the current source search location is not a match, and the process ends for that location at 500. If the pixels do match, or if the mask pixel is not white, and therefore a do-not-care type pixel, then an inquiry is made at 502 as to whether all of the pixels of the sought after image have been tested. If all of the pixels have been tested, then a match is indicated at 504. If all of the pixels have not been tested, then the process reverts to 492 for consideration of the next pixel.

Figure 37:
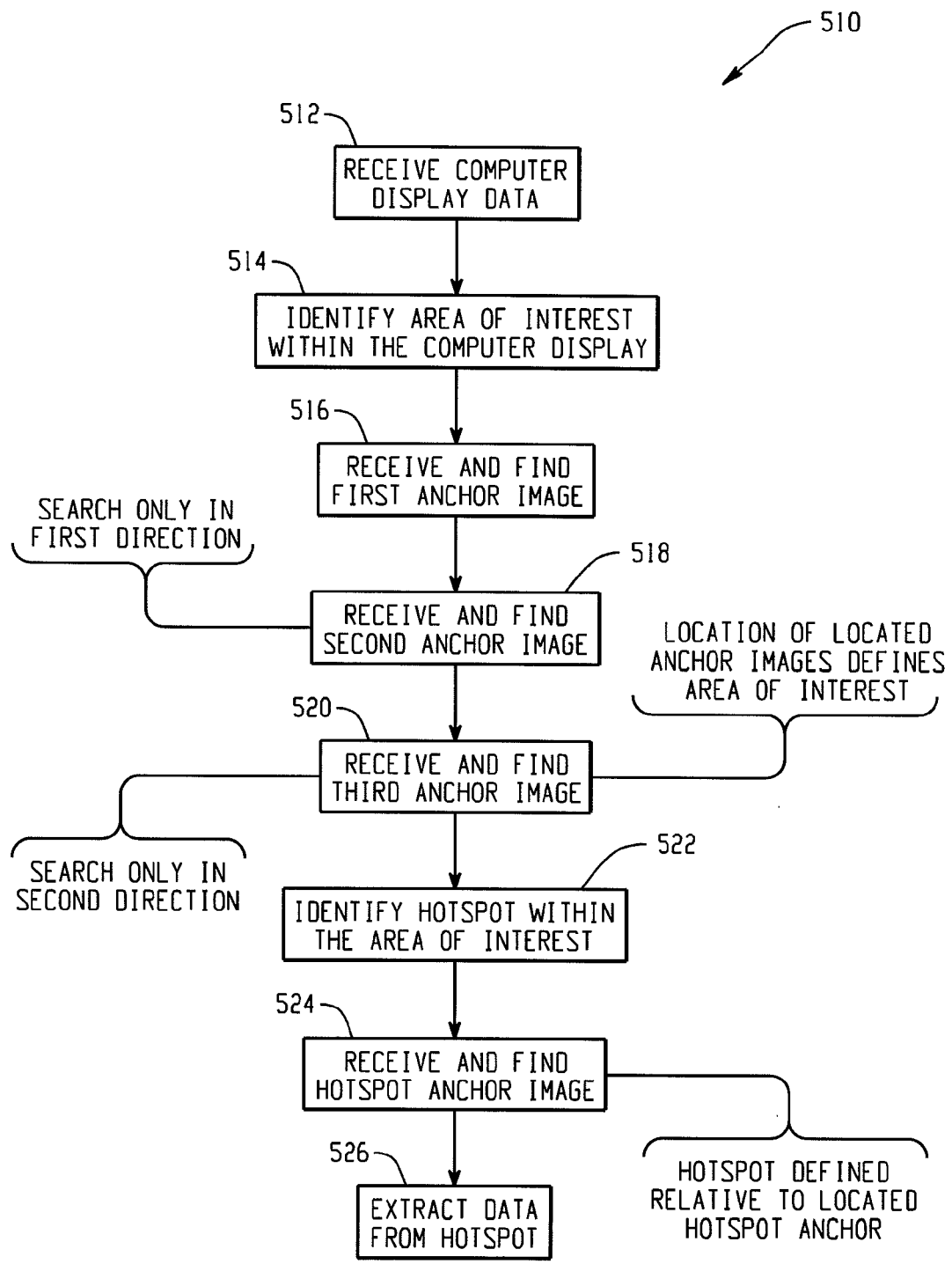
FIG. 37 is a flow diagram depicting a processor-implemented method for extracting a data value from within a computer display hotspot following identification of the data hotspot on the computer display.

FIG. 37 is a flow diagram depicting a processor-implemented method for extracting a data value from within a computer display hotspot following identification of the data hotspot on the computer display. At 512, computer display data indicative of the contents of a computer display is received. An area of interest is identified within the computer display at 514, where the identifying includes receiving and finding a first anchor image at 516, receiving and finding a second anchor image at 518 by searching in only a first direction, and receiving and finding a third anchor image at 520 by searching in only a second direction. The first anchor point, the second anchor point, and the third anchor point define the area of interest. At 522, a hotspot is identified within the area of interest by receiving and finding a hotspot anchor image at 524. A data value is then extracted from a position relative to the computer display data hotspot at 526.

Figure 38:
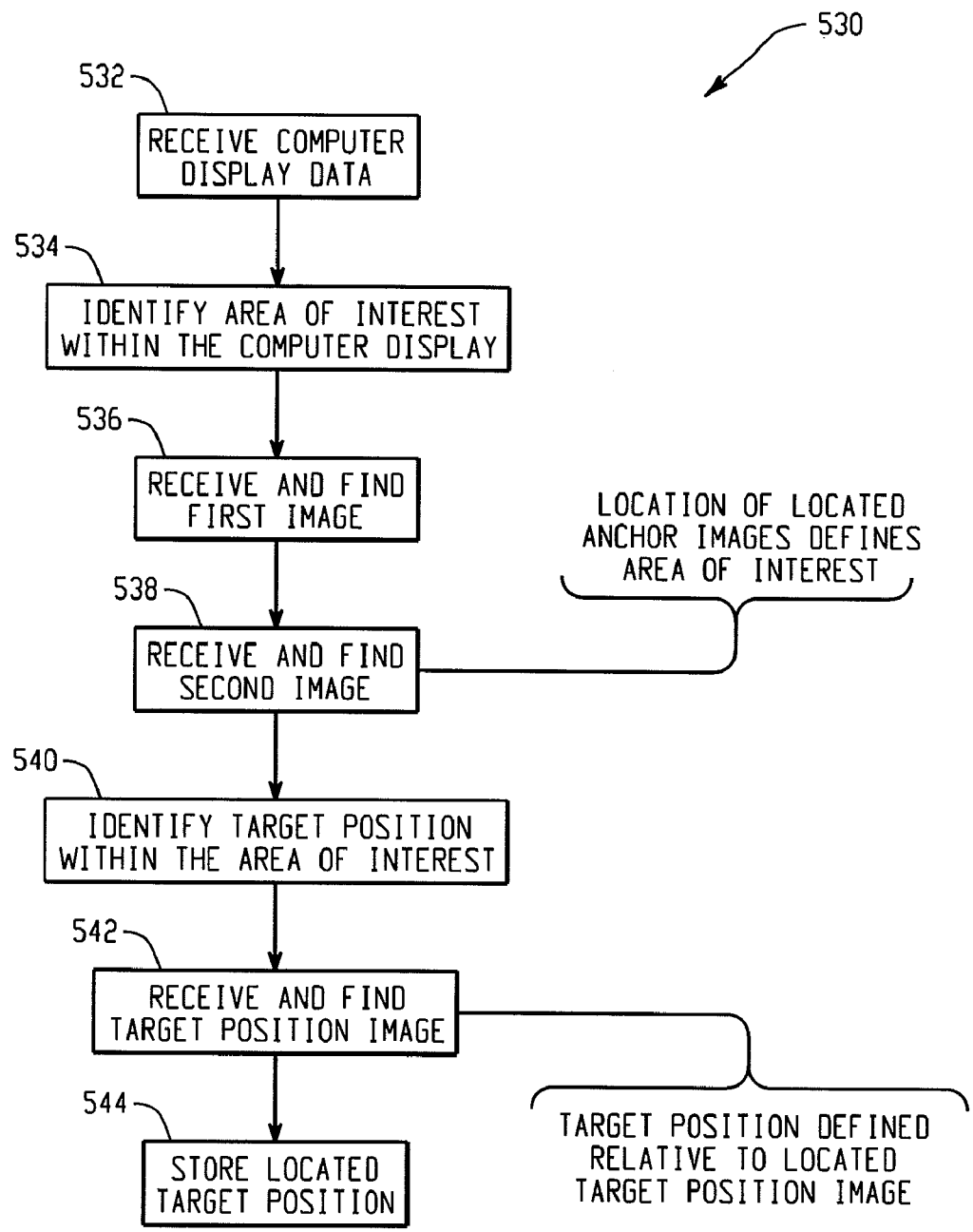
FIG. 38 is a flow diagram depicting a processor-implemented method for identifying a target position on a computer display device.

FIG. 38 is a flow diagram depicting a processor-implemented method for identifying a target position on a computer display device. Computer display data indicative of contents of a computer display is received at 532. At 534, an area of interest is identified within the computer display, where the identifying includes, receiving and finding a first image at 536 and receiving and finding a second image at 538, where the first point and the second point, corresponding to the locations of the first and second images, respectively, are used in defining the area of interest. A target position within the area of interest is identified at 540 by receiving and finding a target position image at 542, where a location of the match for the target position image is identified as a target position. The target position is stored in a computer-readable memory at 544.

Figure 39:
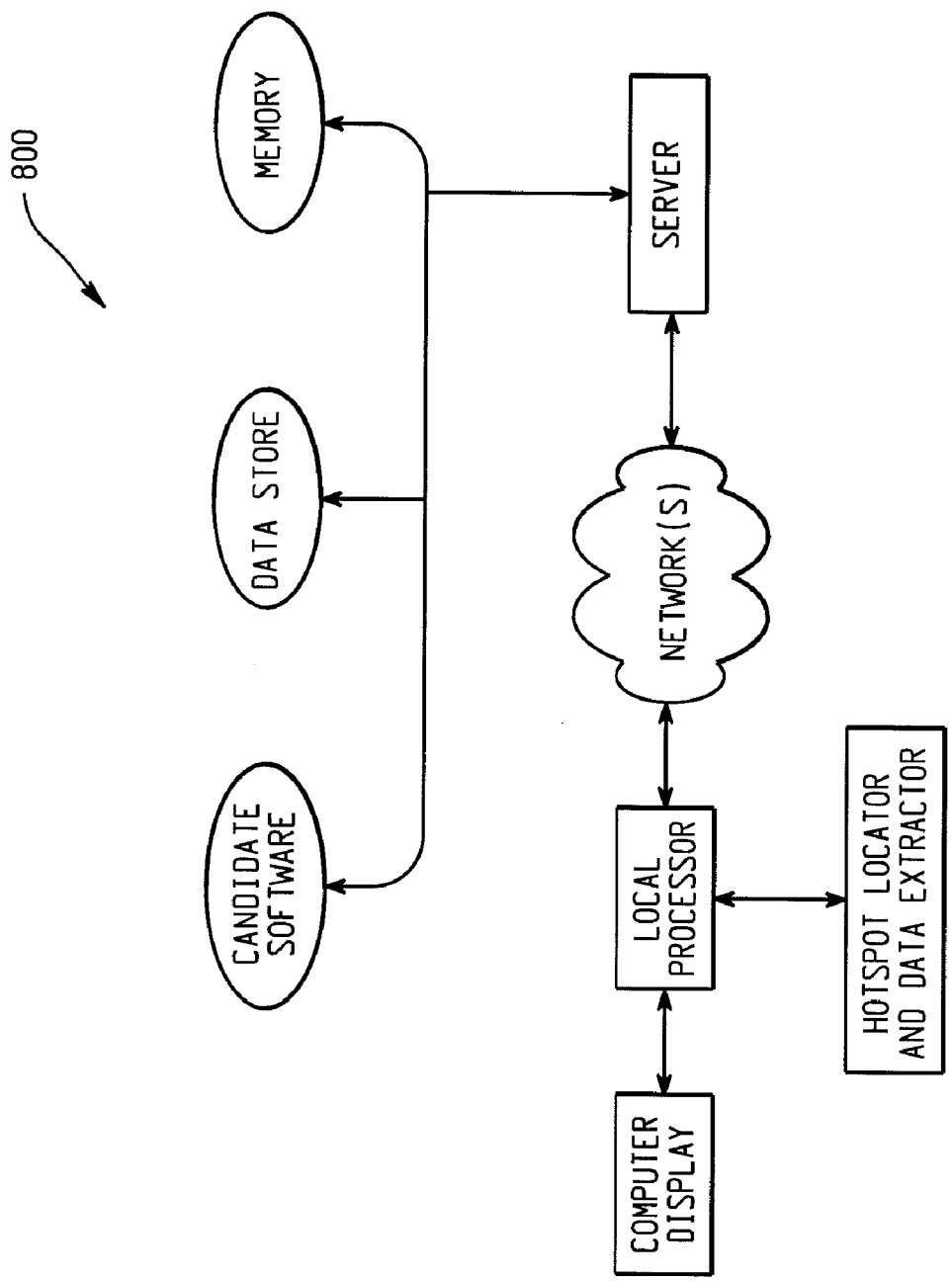
FIG. 39 depicts a hotspot locator and data extractor accessing a server containing candidate software via a network.

This written description uses examples to disclose the invention, including the best mode, and also to enable a person skilled in the art to make and use the invention. The patentable scope of the invention may include other examples. For example, FIG. 39 depicts a hotspot locator and data extractor accessing a server containing candidate software via a network at 800.

As another example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method, comprising:
   accessing, on a computing device, one or more anchor images, one or more area of interest parameters, and one or more hotspot parameters;
   receiving display data including contents of a display;
   identifying an area of interest in the display using one or more anchor images and the one or more area of interest parameters, wherein the area of interest is identified as an horizontal area between two points associated with an image, a vertical area between two points associated with one or more images, or an horizontal area and a vertical area between two points associated with one or more images, and wherein the area of interest is identified by searching the display in a horizontal or a vertical direction from a point associated with an image;
   receiving a hotspot anchor image;
   determining a hotspot anchor point by graphically matching the hotspot anchor image to the area of interest;
   determining, on the computing device, a hotspot within the area of interest using the hotspot anchor point and the one or more hotspot parameters, wherein the hotspot is defined relative to the hotspot anchor point; and
   determining one or more data values corresponding to one or more positions in the display, wherein a data value is determined relative to the hotspot.

2. The method of claim 1, wherein determining the hotspot within the area of interest includes defining the hotspot relative to a target position.

3. The method of claim 1, further comprising:
extracting a data value relative to the hotspot.

4. The method of claim 1, wherein the data value is an output of a software program being tested without using testing code in the software program.

5. The method of claim 1, further comprising:
identifying a data value using an optical character recognition technique.

6. The method of claim 1, wherein the area of interest corresponds to a window on a graphical interface in the display.

7. The method of claim 6, wherein the hotspot corresponds to a cell of a table within the window on the graphical interface.

8. The method of claim 6, wherein the hotspot corresponds to a table within the window on the graphical interface.

9. The method of claim 8, further comprising:
identifying a cell is within the table, and
extracting a data value from within the cell.

10. The method of claim 9, further comprising:
identifying the cell is using a cell anchor image or an offset from the hotspot.

11. The method of claim 6, further comprising:
extracting a data value from a display component in the graphical interface.

12. The method of claim 11, wherein extracting the data value from the display component includes extracting the data value from a button, a check box, a radio selector, and a text field.

13. The method of claim 1, wherein determining a data value includes manipulating a display component.

14. The method of claim 1, further comprising:
receiving, on the computing device, the one or more anchor images, the one or more area of interest parameters, or the one or more hotspot parameters.

15. The method of claim 1, wherein accessing includes accessing the one or more anchor images, the one more area of interest parameters, or the one or more hotspot parameters from a data store.

16. The method of claim 15, wherein the accessing from the data store includes accessing from a file, a flat file, a database, a relational database management system (RDBMS), a multi-dimensional database (MDDB) or an Online Analytical Progressing (OLAP) database.

17. The method of claim 1, further comprising:
calculating, with a data processor, the one or more anchor images, the one or more area of interest parameters, or the one or more hotspot parameters.

18. A computer-implemented system, comprising:
one or more data processors;
one or more non-transitory computer-readable storage mediums containing instructions configured to cause the one or more data processors to perform operations including:
accessing one or more anchor images, one or more area of interest parameters, and one or more hotspot parameters;
receiving display data including contents of a display;
identifying an area of interest in the display using one or more anchor images and the one or more area of interest parameters, wherein the area of interest is identified as an horizontal area between two points associated with an image, a vertical area between two points associated with one or more images, or an horizontal area and a vertical area between two points associated with one or more images, and wherein the area of interest is identified by searching the display in a horizontal or a vertical direction from a point associated with an image;
receiving a hotspot anchor image;
determining a hotspot anchor point by graphically matching the hotspot anchor image to the area of interest;
determining a hotspot within the area of interest using the hotspot anchor point and the one or more hotspot parameters, wherein the hotspot is defined relative to the hotspot anchor point; and
determining one or more data values corresponding to one or more positions in the display, wherein a data value is determined relative to the hotspot.

19. The system of claim 18, wherein determining the hotspot within the area of interest includes defining the hotspot relative to a target position.

20. The system of claim 18, further comprising instructions configured to cause the one or more data processors to perform operations including:
extracting a data value relative to the hotspot.

21. The system of claim 18, wherein the data value is an output of a software program being tested without using testing code in the software program.

22. The system of claim 18, further comprising instructions configured to cause the one or more data processors to perform operations including:
identifying a data value using an optical character recognition technique.

23. The system of claim 18, wherein the area of interest corresponds to a window on a graphical interface in the display.

24. The system of claim 23, wherein the hotspot corresponds to a cell of a table within the window on the graphical interface.

25. The system of claim 23, wherein the hotspot corresponds to a table within the window on the graphical interface.

26. The system of claim 25, further comprising instructions configured to cause the one or more data processors to perform operations including:
identifying a cell is within the table, and
extracting a data value from within the cell.

27. The system of claim 26, further comprising instructions configured to cause the one or more data processors to perform operations including:
identifying the cell is using a cell anchor image or an offset from the hotspot.

28. The system of claim 23, further comprising instructions configured to cause the one or more data processors to perform operations including:
extracting a data value from a display component in the graphical interface.

29. The system of claim 28, wherein extracting the data value from the display component includes extracting the data value from a button, a check box, a radio selector, and a text field.

30. The system of claim 18, wherein determining a data value includes manipulating a display component.

31. The system of claim 18, further comprising instructions configured to cause the one or more data processors to perform operations including:
receiving the one or more anchor images, the one or more area of interest parameters, or the one or more hotspot parameters.

32. The system of claim 18, wherein accessing includes accessing the one or more anchor images, the one more area of interest parameters, or the one or more hotspot parameters from a data store.

33. The system of claim 32, wherein the accessing from the data store includes accessing from a file, a flat file, a database, a relational database management system (RDBMS), a multi-dimensional database (MDDB) or an Online Analytical Progressing (OLAP) database.

34. The system of claim 18, further comprising instructions configured to cause the one or more data processors to perform operations including:
calculating the one or more anchor images, the one or more area of interest parameters, or the one or more hotspot parameters.

35. A computer-program product, tangibly embodied in a non-transitory machine-readable storage medium, including instructions configured to cause a data processing apparatus to:
access one or more anchor images, one or more area of interest parameters, and one or more hotspot parameters;
receive display data including contents of a display;
identify an area of interest in the display using one or more anchor images and the one or more area of interest parameters, wherein the area of interest is identified as an horizontal area between two points associated with an image, a vertical area between two points associated with one or more images, or an horizontal area and a vertical area between two points associated with one or more images, and wherein the area of interest is identified by searching the display in a horizontal or a vertical direction from a point associated with an image;
receive a hotspot anchor image;
determine a hotspot anchor point by graphically matching the hotspot anchor image to the area of interest;
determine a hotspot within the area of interest using the hotspot anchor point and the one or more hotspot parameters, wherein the hotspot is defined relative to the hotspot anchor point; and
determine one or more data values corresponding to one or more positions in the display, wherein a data value is determined relative to the hotspot.

36. The computer-program product of claim 35, wherein determining the hotspot within the area of interest includes defining the hotspot relative to a target position.

37. The computer-program product of claim 35, further comprising instructions configured to cause a data processing apparatus to:
extract a data value relative to the hotspot.

38. The computer-program product of claim 35, wherein the data value is an output of a software program being tested without using testing code in the software program.

39. The computer-program product of claim 35, further comprising instructions configured to cause a data processing apparatus to:
identify a data value using an optical character recognition technique.

40. The computer-program product of claim 35, wherein the area of interest corresponds to a window on a graphical interface in the display.

41. The computer-program product of claim 40, wherein the hotspot corresponds to a cell of a table within the window on the graphical interface.

42. The computer-program product of claim 40, wherein the hotspot corresponds to a table within the window on the graphical interface.

43. The computer-program product of claim 42, further comprising instructions configured to cause a data processing apparatus to:
identify a cell is within the table, and
extract a data value from within the cell.

44. The computer-program product of claim 43, further comprising instructions configured to cause a data processing apparatus to: identify the cell is using a cell anchor image or an offset from the hotspot.

45. The computer-program product of claim 40, further comprising instructions configured to cause a data processing apparatus to:
extract a data value from a display component in the graphical interface.

46. The computer-program product of claim 45, wherein extracting the data value from the display component includes extracting the data value from a button, a check box, a radio selector, and a text field.

47. The computer-program product of claim 35, wherein determining a data value includes manipulating a display component.

48. The computer-program product of claim 35, further comprising instructions configured to cause a data processing apparatus to:
receive the one or more anchor images, the one or more area of interest parameters, or the one or more hotspot parameters.

49. The computer-program product of claim 35, wherein accessing includes accessing the one or more anchor images, the one more area of interest parameters, or the one or more hotspot parameters from a data store.

50. The computer-program product of claim 49, wherein the accessing from the data store includes accessing from a file, a flat file, a database, a relational database management system (RDBMS), a multi-dimensional database (MDDB) or an Online Analytical Progressing (OLAP) database.

51. The computer-program product of claim 35, further comprising instructions configured to cause a data processing apparatus to:
calculate the one or more anchor images, the one or more area of interest parameters, or the one or more hotspot parameters.

* * * * *